(12) United States Patent
Vishnubhatla et al.

(10) Patent No.: US 8,706,810 B2
(45) Date of Patent: Apr. 22, 2014

(54) REAL-TIME COLLABORATIVE DOCUMENT REVIEW AND TRANSFER METHOD AND SYSTEM

(71) Applicant: Mounza Inc., Fremont, CA (US)

(72) Inventors: Kalyan Vishnubhatla, Berkeley Heights, CA (US); Sharran Deora, Fremont, CA (US)

(73) Assignee: Mounza Inc., Fremont, CA (US)

( * ) Notice: Subject to any disclaimer, the term of this patent is extended or adjusted under 35 U.S.C. 154(b) by 0 days.

(21) Appl. No.: 13/935,236

(22) Filed: Jul. 3, 2013

(65) Prior Publication Data

US 2014/0019585 A1    Jan. 16, 2014

Related U.S. Application Data

(60) Provisional application No. 61/667,834, filed on Jul. 3, 2012.

(51) Int. Cl.
*G06F 15/16*    (2006.01)

(52) U.S. Cl.
USPC ............................ 709/204; 709/205; 709/206

(58) Field of Classification Search
None
See application file for complete search history.

(56) References Cited

U.S. PATENT DOCUMENTS

| | | | |
|---|---|---|---|
| 2004/0186852 A1* | 9/2004 | Rosen | 707/104.1 |
| 2007/0136657 A1* | 6/2007 | Blumenthal et al. | 715/512 |
| 2010/0036712 A1* | 2/2010 | Abrahamsohn | 705/10 |
| 2010/0211601 A1* | 8/2010 | Gaitas | 707/770 |
| 2010/0325101 A1* | 12/2010 | Beal et al. | 707/707 |
| 2011/0179119 A1* | 7/2011 | Penn | 709/205 |
| 2012/0209909 A1* | 8/2012 | Huang et al. | 709/204 |
| 2013/0124638 A1* | 5/2013 | Barreto et al. | 709/205 |

* cited by examiner

*Primary Examiner* — Peling Shaw
(74) *Attorney, Agent, or Firm* — Courtney IP Law; Barbara B. Courtney

(57) ABSTRACT

A computer based document review and transfer system and method is disclosed. In an embodiment, the system receives a request from user for a unique identifier (ID). The system generates a unique ID and assigns it to the user. Users access the system to upload documents and other data. Users can request that documents and data be sent to another user by referencing the other user's unique ID. The system stores all documents and data on a cloud server that is accessible from any type of user device. Data consistency is maintained across devices. Access to documents and data comprises collaborative review of a document simultaneously by multiple users, revision of the document by one or more users; recording comments on the document by one or more users, and transfer of the document to various user devices. Data analytics are also performed on the data and various statistical information made available to users.

30 Claims, 55 Drawing Sheets

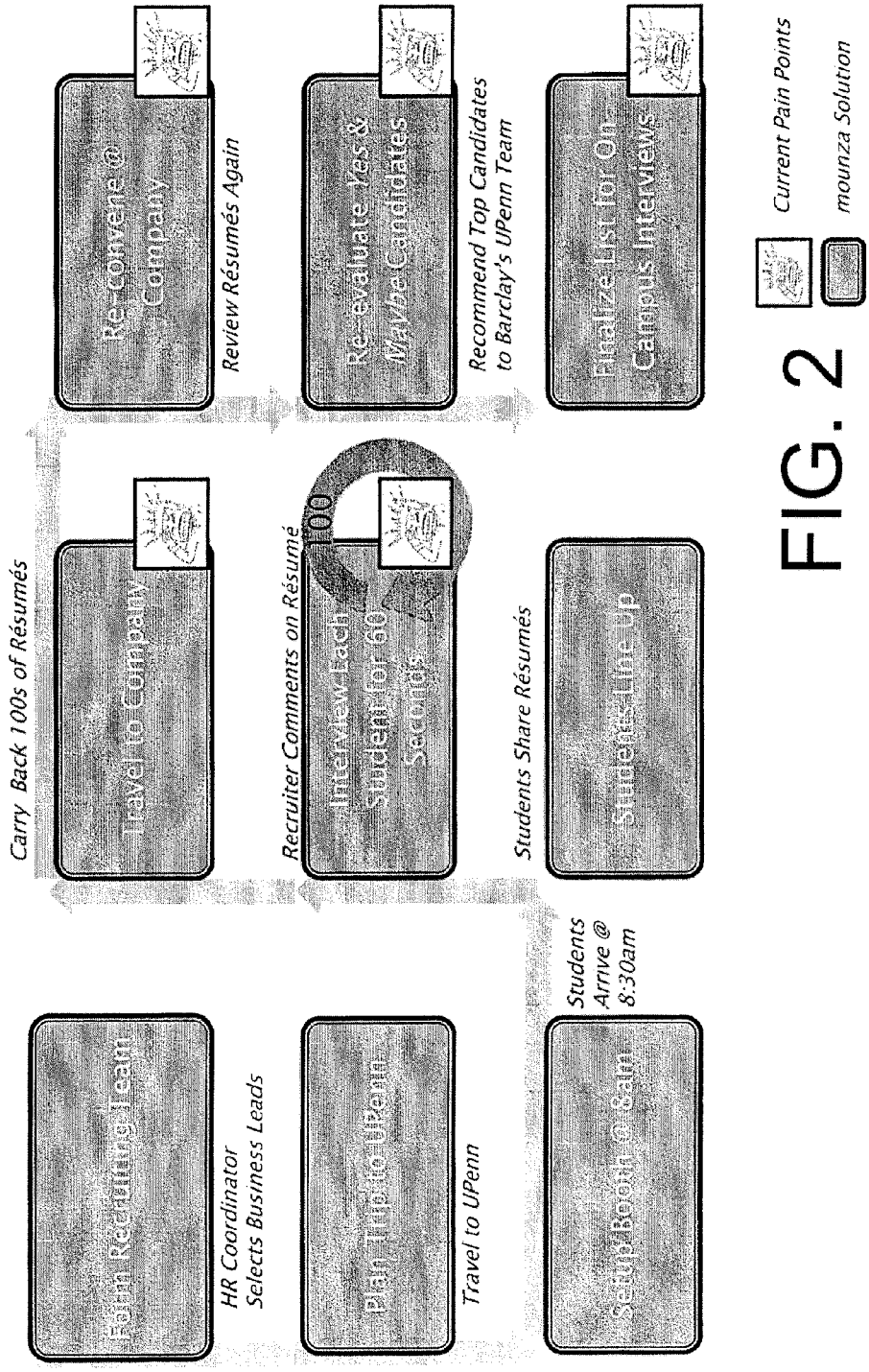

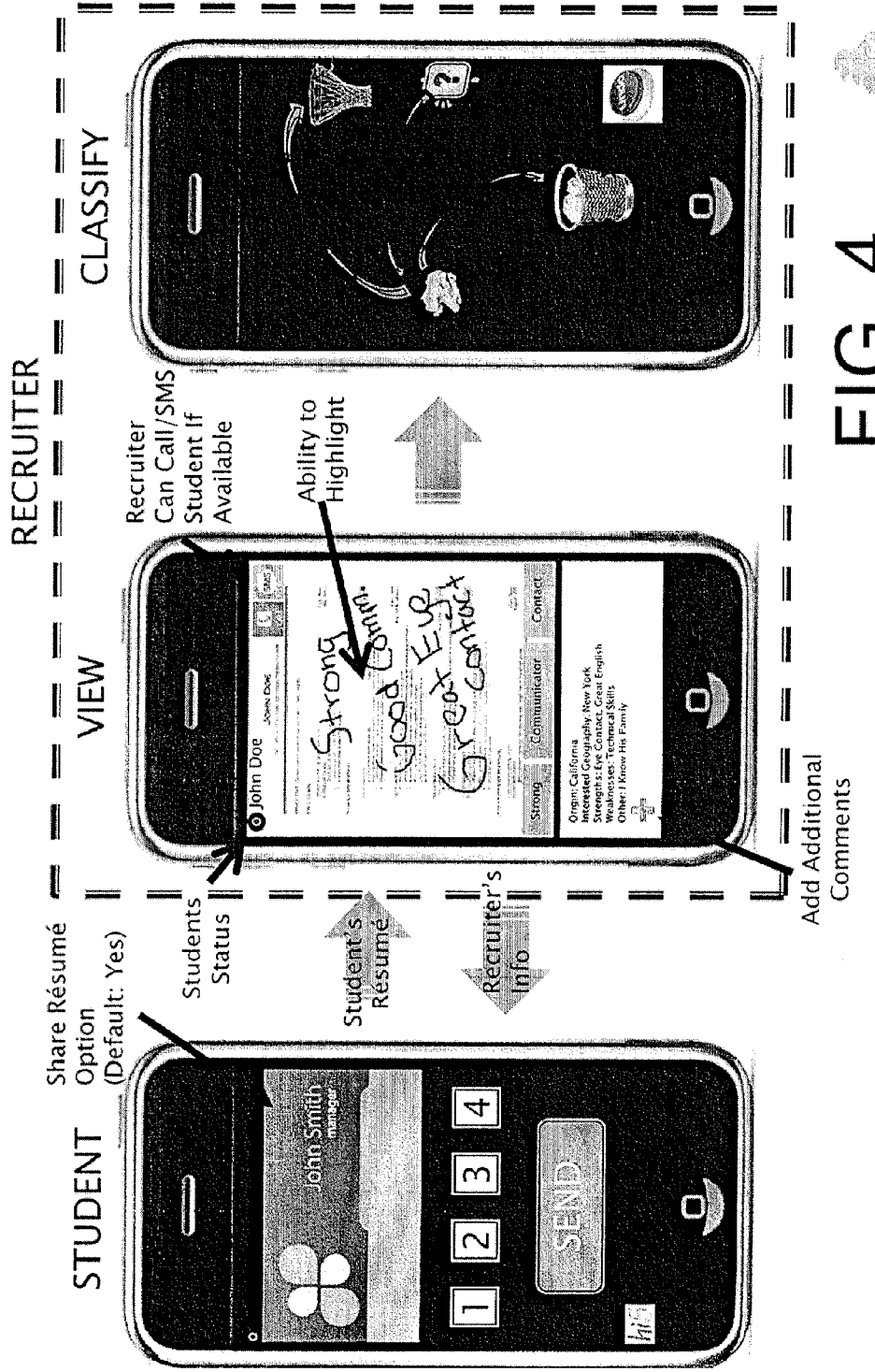

Student Screen:

Recruiter Screen:

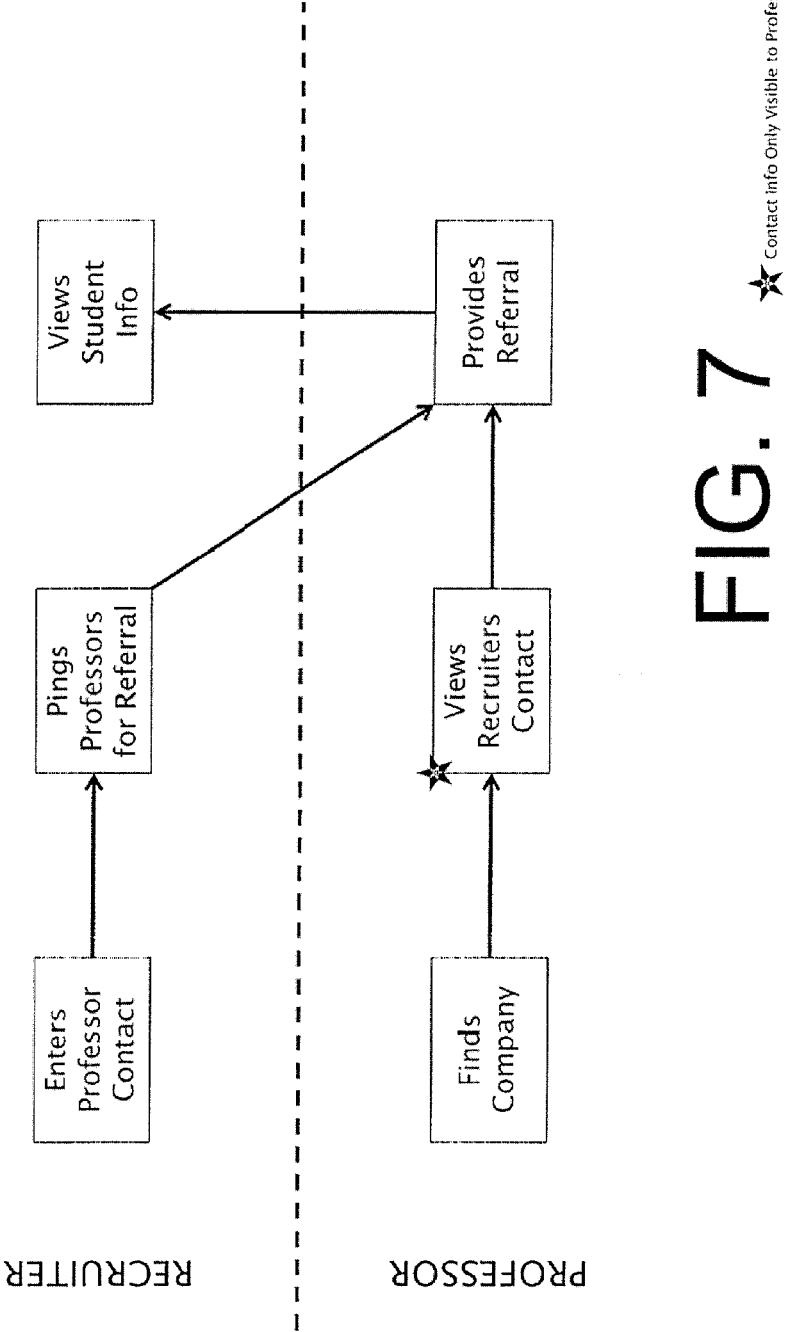

From: Kristina H. Chung

Associate Analyst Positions at Apple Inc.

05/21/2012  11:20 AM

Lorem ipsum dolor sit amet, consectetur adipisicing elit, sed do eiusmod tempor incididunt ut labore et dolore magna aliqua. Ut enim ad minim veniam, quis nostrud exercitation ullamco laboris nisi ut aliquip ex ea commodo consequat. Duis aute irure dolor in reprehenderit in voluptate velit esse cillum dolore eu fugiat nulla pariatur.

Thanks,
Kristina

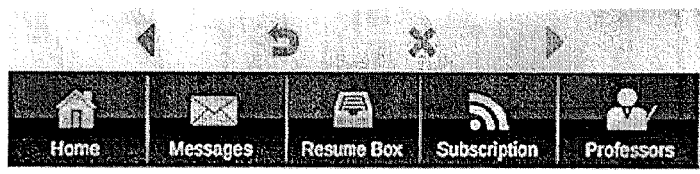

Fig. 12

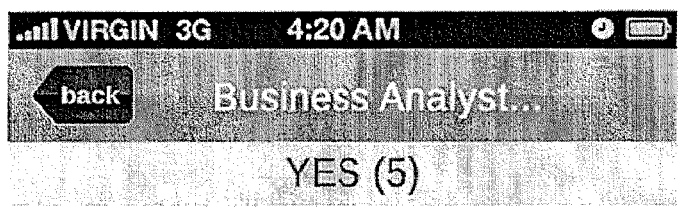
Fig. 39

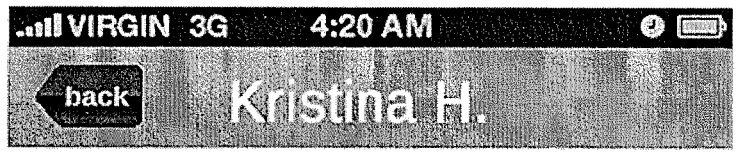
Fig. 52

REAL-TIME COLLABORATIVE DOCUMENT REVIEW AND TRANSFER METHOD AND SYSTEM

BACKGROUND

With the growth of technology, individuals today are more connected than they ever before. It is common for a single individual to carry one or more mobile devices at any time. However, with multiple devices, there are challenges when users are interacting with one another. One such challenge occurs when users are submitting information to each other.

There is a growing need to send documents via mobile device and between mobile devices and their users, but current solutions are often not as capable as desired. Current solutions include portable storage solutions, and Bump™ (offered by Bump Technologies, Mountain View, Calif.). It is not feasible for users to carry a portable storage device at all times. Although users can send emails, they cannot easily refer to previously sent or received information seamlessly. Emails may be lost, or become hard to find or track. There are no APIs to build on top of emails for automation. Additionally, when individuals are in a face-to-face professional or corporate setting, none of these solutions are viable solutions. Individuals might not wish to Bump™ phones in a corporate setting.

Current solutions are further limited in their ability to instantly share documents and comments among users. For example, Recsolu™ provides recruiting software to universities. The software aids with management of resumes and organization of career fairs, etc. but does not provide instant transfer of resumes or other documents in real-time from any device to any device between users. There is latency in the Recsolu™ system because a recruiter must first scan the applicant's QR code when the applicant is in front of the recruiter, the QR code is then forwarded to the server over the internet, and the server processes the QR code and then sends the applicant's profile which then allows the recruiter to view the applicant's profile. The resume or profile information cannot be sent in advance to the particular recruiter by the applicant.

FIG. 1 is a diagram illustrating a student user's perspective of the prior art career fair experience. Traditionally, students wait in lines to visit booths of various employers. A hard copy resume is handed to the recruiter once the student gets a turn in line. The face-to-face conversation with the recruiter does not last long; perhaps 60 seconds. This waiting and resume-handing can be repeated more than 15 times at different employer booths. After the career fair experience, the student must wait for any call-backs, sometimes for weeks and potentially months.

FIG. 2 is a diagram illustrating an employer's trip to a university career event with only the prior art available. From the employer's perspective, the traditional career fair has some areas for improvement (pain points). The employer must form a recruiting team and plan the physical trip (in this example, to a university). The booth must be set up early in the day as the students are lining up. The recruiters then spend the day steadily interviewing students and receiving resumes many times over. By the end of the day, students' faces and the impressions they conveyed tend to blur. Recruiters may write notes by hand on resumes to record impressions as they experience them. After the career fair, hundreds of resumes are carried back to the company. The resumes must be reviewed again, and each candidate re-evaluated and classified. For example, resumes might be grouped as "yes", "maybe" or "no". From the "Yes" and "Maybe" lists, a finalized list for on-campus interviews is generated.

There is a need for a system and method for real-time collaborative document review and transfer including the use of mobile devices.

BRIEF DESCRIPTION OF THE DRAWINGS

FIG. 2 is a block diagram illustrating a prior art method of sharing documents and information.

FIG. 4 is a diagram of student and recruiter device screens according to an embodiment.

FIGS. 5A-5D are diagrams of student and recruiter device screens according to an embodiment.

FIG. 7 is a block diagram illustrating a professor portal according to an embodiment.

FIGS. 10-53 show mobile device screens seen by students and recruiters using an embodiment of the invention.

DETAILED DESCRIPTION

Figure 1:
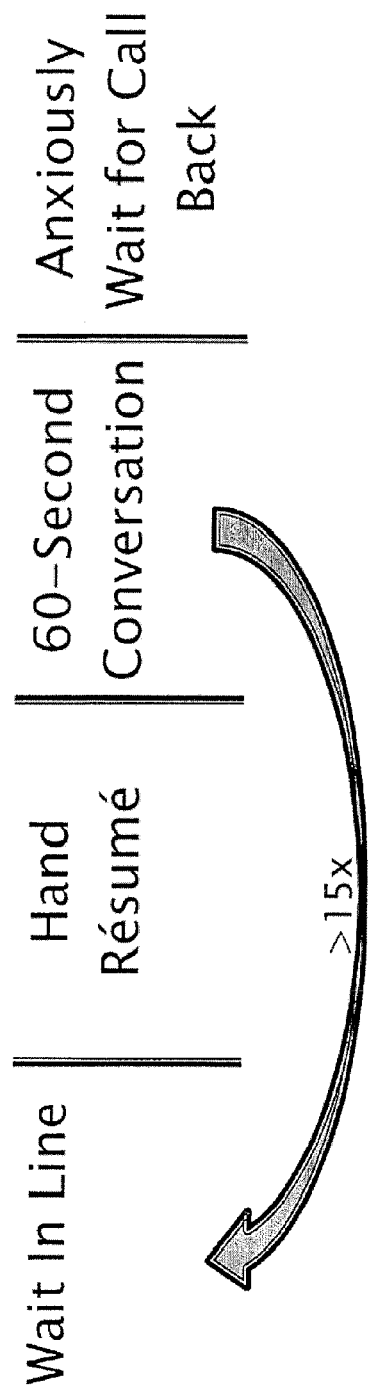
FIG. 1 is a block diagram illustrating a prior art method of sharing documents and information.

Embodiments of a method and system for secure real-time collaborative document review and transfer are described. Embodiments enable users to send data and documents with full transparency, and on any device. In addition, users can quickly provide comments on documents, and the comments are stored with the documents in a database accessible to a selected group of users who each can review and comment on the data. For purposes of illustration, and not limitation, aspects of the invention will be described as a method and system for, job applicants and, job recruiters. However, the invention is applicable to other particular environments. The examples used for illustration demonstrate the advantages of instantly communicating data and storing data, including real-time observations. The environment of a career fair with hundreds of applicants and hundreds of employers lends itself to a solution for the problem of having a very large amount of data to review in a short period of time, combined with the goal of having human interaction and making notes on the interaction for later review. Therefore, the career fair environment is used as an example of a use that embodiments of the invention are appropriate for. However, embodiments are not limited to career fairs or job-seeking scenarios.

In this document, a service called Mounza will be used as an example of embodiments of the invention. The service provides each person wishing to transfer (receive or send) data via the service with a unique identification (ID) for transferring data. In an example embodiment as described herein the person can be a job recruiter. The unique ID can be alphanumeric, graphic, or any electronic format that uniquely identifies the individual receiving/sending the data. The ID can be an email address, a company name plus a recruiter number, a job ID plus a recruiter number, a photo of the recruiter, etc. When a sender is trying to send data to a receiver, the receiver's ID must be provided. The service performs the data transfers on the back end, and the receiver receives a notification that the data is received. The notification is received on any and all supported electronic communication devices. Herein, the terms "data" and "document" are used interchangeably, but the data is not limited to a text document, or other particular form of data. Examples of files types supported include without limitation, .jpg, .gif, .png, .tiff. The service and system as described herein includes necessary software for platform support on individual devices.

According to some embodiments, location-based services (LBS) are used to allow recruiters and students to detect each other's proximity. In such an embodiment, a student does not need to enter a recruiter ID, but can see which recruiters are near at a particular time, and send information to selected ones of the recruiters in proximity. In addition students can send resumes and other information to other students for critique and comments.

Once received, the document can be viewed on any device. Documents can be downloaded and transferred in any way. The received version is stored on a Mounza server. This allows the receiver (and other users) to view the document on any and all devices.

Additionally, Mounza provides a set of application programming interfaces (APIs) for automation. For example, a user can submit a resume to a recruiter at a career fair, and that resume is automatically submitted into the recruitment platform at the organization the recruiter is representing. Previously, this would have required digitizing the applicant's paper resume for submission—a manual process.

Figure 3A:
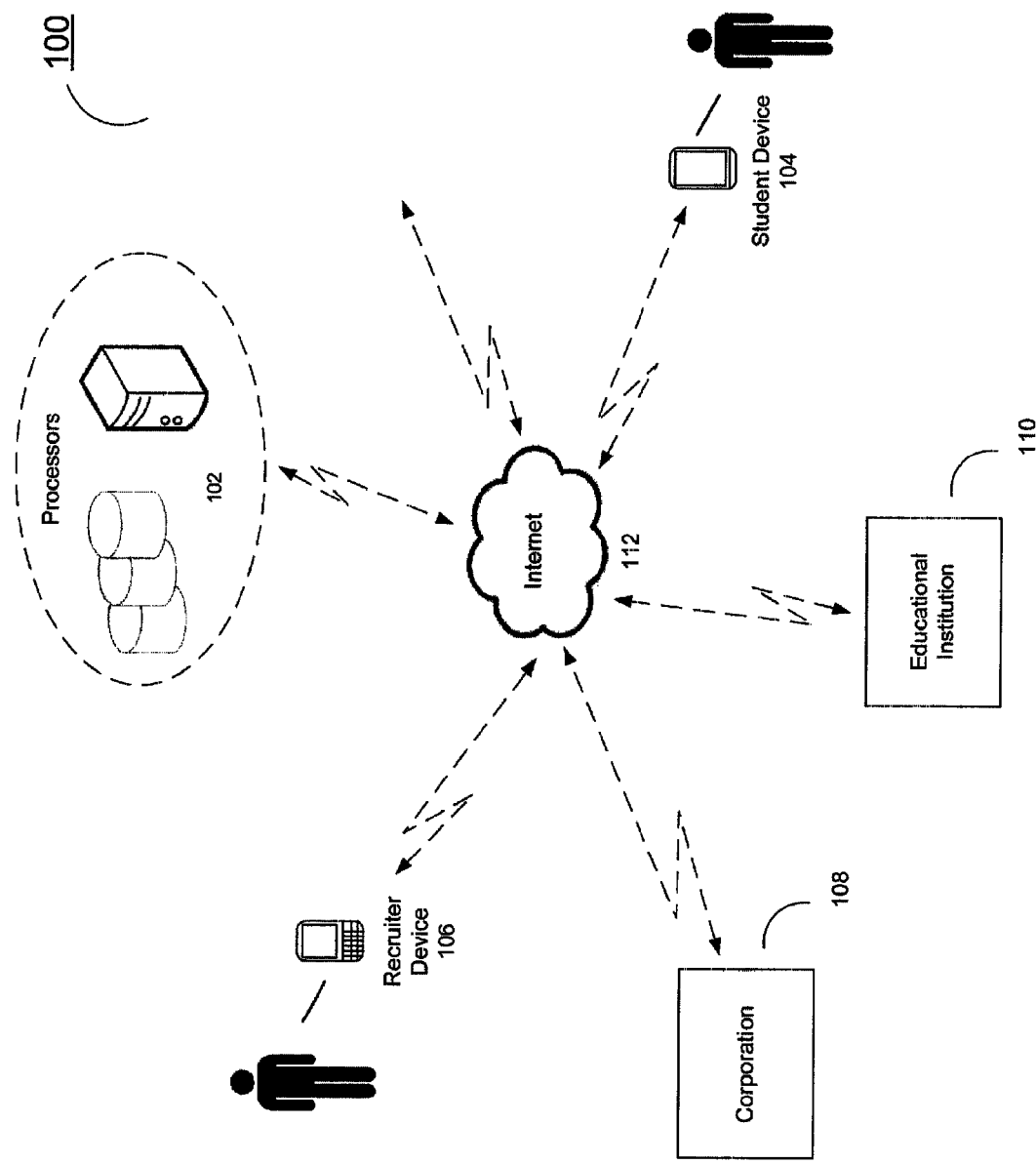
FIG. 3A is a diagram of a system according to an embodiment.

FIG. 3A is a block diagram of a collaborative document review and transfer system 100 according to an embodiment. A document review and transfer service provider 102 includes computer processors and databases. In this document a system and service known as Mounza will be used as an example of a service provider 102, but embodiments are not so limited. The service provider 102 maintains servers accessible via the interne 112 ("cloud servers"). Although the servers, processors and databases 102 are shown in a discrete location in FIG. 3A, they can be distributed geographically in any manner, as is known in cloud computing. A student uses a student mobile device 104 to download a Mounza mobile application (app). In this scenario, the student plans to attend a career fair or similar event, at which various recruiters represent various employers. Each recruiter who has signed up for the Mounza service is assigned a unique identifier. The student enters the recruiter's identifier using the Mounza app, and receives the recruiter's electronic business card. The recruiter also has a mobile device 106 that runs a Mounza app. Other devices not shown, such as personal computers and tablet computers, also run the Mounza app and a user's data is kept consistent across all platforms.

Figure 3B:
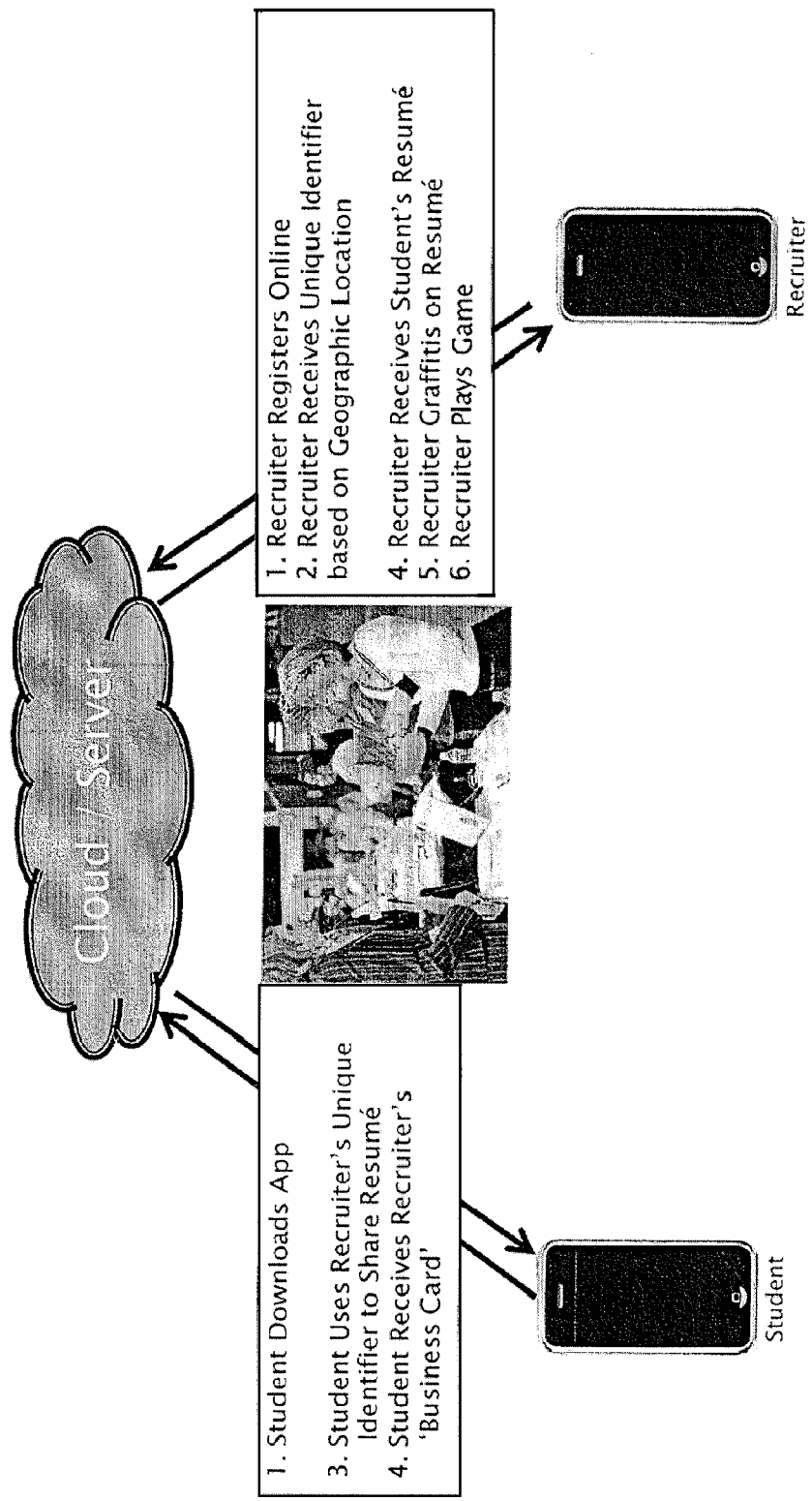
FIG. 3B is a diagram illustrating information and document sharing according to an embodiment.

FIG. 3B is a diagram overview of a method according to an embodiment. The recruiter's participation includes the activities shown on the right side of the diagram. The recruiter registers with Mounza online using either a recruiter mobile device 106 as shown, or a personal computer. The recruiter receives the unique identifier (ID) assigned to him or her. In one embodiment, the ID is based on the recruiter's geographic location, but that is not required. Once the recruiter has received notification that the student has entered the ID for the purpose of sending the student's resume to the recruiter and pressed "SEND", the recruiter receives the resume on the mobile device. As further illustrated herein, the recruiter can "graffiti" on the resume. As used herein, to graffiti means to touch the device screen and create an image file containing the symbols or letters "drawn" by the touching. The recruiter can also play "games" provided by Mounza. Games include activities that make the process of attending the career fair, collecting resumes, recording impressions of students, storing and sharing data, etc., fun and quick.

FIG. 4 is a diagram illustrating aspects of a method including interaction between users at a job fair according to an embodiment. Embodiments of the invention mitigate pain points of prior solutions by allowing recruiters to receive resumes in advance electronically. Recruiters can also electronically record impressions of the students directly on the student resume in real-time, and categorize/store/distribute the processed resume in real-time. The recruiter receives advance resumes from students who have taken a particular interest in the company and identified the recruiter beforehand. If there is time, the recruiter can review the resume in advance of meeting the student. Later, the recruiter does not need to carry back paper resumes or categorize them. It has already been done. With reference to the figure, the student enters the mobile app and chooses to send the resume to the recruiter (who has been identified by a unique ID sent to the student device). Here, the student has typed in the ID to send his resume to John Smith. The recruiter's "share contact information" option is set to Yes. If the option is set to no, the student will not receive the recruiter's contact information. On the recruiter side, the recruiter can view the resume in its original format. The recruiter can highlight the resume, and write comments by grafittiing directly on the resume. The recruiter can also type comments in a field below the resume. When the recruiter has finished reviewing and commenting he or she can classify the resume immediately. Once the recruiter is finished using the resume and associated information, and making any highlights or comments, the recruiter can play a game as shown on the right. In this embodiment of the game, the resume can be "classified" in the basket for "yes", "classified" at the question sign for "maybe" or "classified" in the garbage can for "no". Other versions of the games provide functionality similar to this one.

On the right side of the diagram, two recruiter screens are shown. In the View screen, the student's resume appears as soon as the student presses the SEND button. The student sets the status to be displayed on this page. Status options include "available right now", "Idle", and "Not Available". The recruiter can SMS the student by pressing the SMS button, or call the student by pressing the CALL button. The contact information entered by the student when signing up for Mounza is accessed for these features. The recruiter has the ability ahead of time to create "tags" appropriate to the company's interest. In this example, the company has identified three qualities that can be tagged: "strong", "communicator", and "contact". This allows the recruiter to quickly describe the candidate, including the intangibles most important to the firm by clicking on one, all or none of the tags. The recruiter can highlight the text of the resume as shown.

Figures 5A, 5B, 5C, 5D:
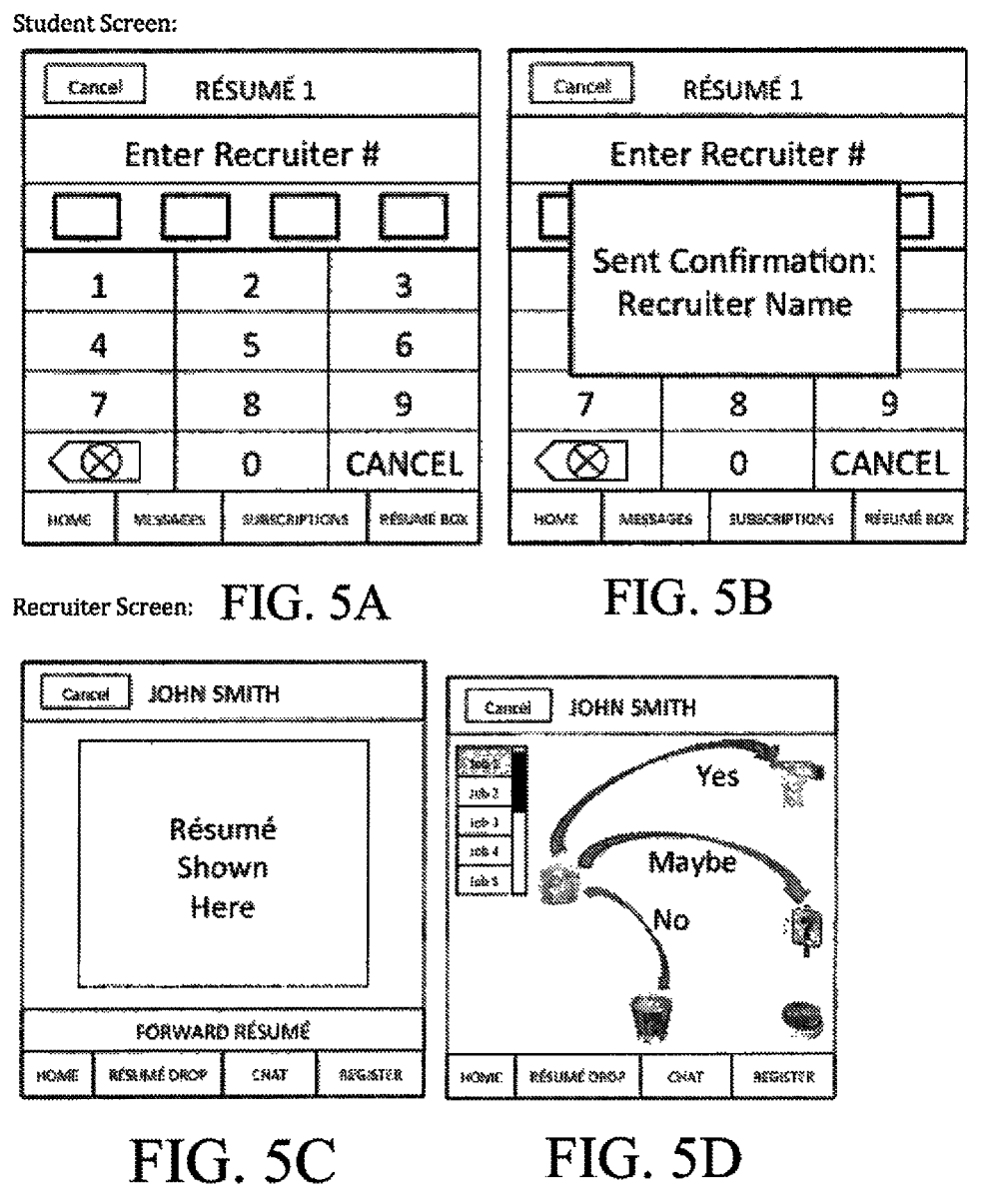

FIGS. 5A-5D are further diagrams of student and recruiter mobile device screens according to an embodiment. Beginning with the FIG. 5A student screen, the student can enter a recruiter ID ("#") to send resume 1 to the recruiter. At the bottom of the screen there is a Home button, a Messages button, a Subscriptions button and a Resume box button. These buttons are described more fully below. In FIG. 5B the screen appears as it does when the student has sent the resume. A sent confirmation appears along with the recruiter's name.

When receiving a document, recruiters will see an alert on their mobile application. The recruiter can open the document within the application, as shown in FIG. 5C, and view the student's resume. The recruiter screen includes a Home button, a Resume drop button, a Chat button and a Register button, which will all be described more fully below. As shown in FIG. 5D, once the recruiter has reviewed the resume, he or she can play a resume classification game to classify the resume as a Yes, a No or a Maybe for each of multiple jobs the recruiter is looking to fill.

Figure 6B:
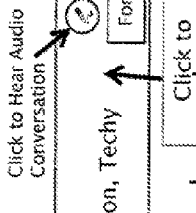
FIGS. 6A-6B are diagrams of a web site according to an embodiment, as viewed by a student and by a recruiter.
Figure 6A:
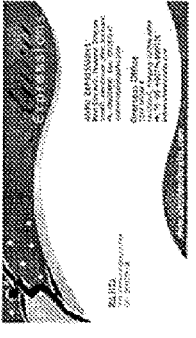

FIGS. 6A and 6B are diagrams of the Mounza web site according to an embodiment, as viewed by a student and by a recruiter. As shown in FIG. 6A, the student can view and update their profile, go to the resume box, which holds various resumes prepared by the student, and view the message inbox or message sent folder. The screen shows a recruiter business card stored in the Mounza database by the student. As shown on the right of this screen, the student can search for business cards alphabetically.

A recruiter web site screen is shown in FIG. 6B. The recruiter also has a profile button to allow review and update of a profile. There is a resume drop button to view the list of jobs the company is recruiting for. Once selecting the job, the recruiter will see the yes/maybe/no classification of the selected job. By classifying the student's application when received, recruiters save time when trying to identify potential hires. There are also Inbox and Sent buttons for viewing messages. This screen shows a collaborative session between the recruiter and their decision-making colleagues. The resume is viewed by all of the collaborators in real-time. This screen lets recruiters see the resumes for a particular, job opening that are in the yes, maybe or no buckets. After collaboration, if needed, recruiters may re-classify a specific resume in another bucket. The "Yes" bucket is the list of candidates that should be interviewed. The "Maybe" bucket is the list of candidates that should be interviewed if there is an interview slot open. The "No" bucket is the list of candidates that the firm will not interview. The "All" bucket is a list of all resumes received for the particular job. If desired, the microphone button allows the recruiter to replay a recording of the face-to-face interview with the student. At the bottom of the screen is a record of live chat, where typed communications among the collaborators appear. The classification names and the number of classifications are configurable by the recruiter. These classifications are shown as an example.

FIG. 7 is a diagram illustrating a network among users of the invention, including a professor portal according to an embodiment. The wide use of the invention builds a network among student, recruiters and professors. Each of these players is driven by different motivations that can all be served in an efficient way during the process of transitioning students from university life to a first job. Recruiters are sales driven and wish to get the best candidates for positions with the least cost. Professors are self-driven, but have a stake in adding to the success of the educational institution by providing valuable input to make the hire rates better for graduates. As shown in the figure a recruiter may enter a professor's contact information, and the professor is then pinged for a referral. The professor can find the company the recruiter works for and view the recruiter's contact information. If the professor chooses to, he or she can provide the requested referral for viewing by the recruiter.

Students are busy and social driven, so a solution as described herein provides a time-saving and friendly way to organize the job hunt and also share information with other students. Students can share resumes and recommendations. They can share job opportunities with other students and critique other student's resumes. The instant access to recruiter information, and company and career fair information makes planning for the career search easier during an extremely hectic time.

Embodiments of the invention provide a durable professional network for student and recent alumni. In addition, relationships between professors and students are enhanced. Students look to alumni and professors for help, and the invention allows a central "meeting" place and a way to centrally share data. This is particularly helpful in today's environment where young professional change jobs often. The network allows ongoing support for job seekers, such as periodic reports of job seeker statistics. Recruiters can make themselves and their companies more visible with very current information, helping the right resume go to the right recruiter the first time. In an embodiment, APIs allow corporate recruiter to integrate embodiments of the invention into existing hiring tools. The invention allows for tracking of success. For example, students will almost always provide their updated status to LinkedIn™Integration with LinkedIn allows collection of data on students and alumni who are hired for various jobs over time.

Figure 8:
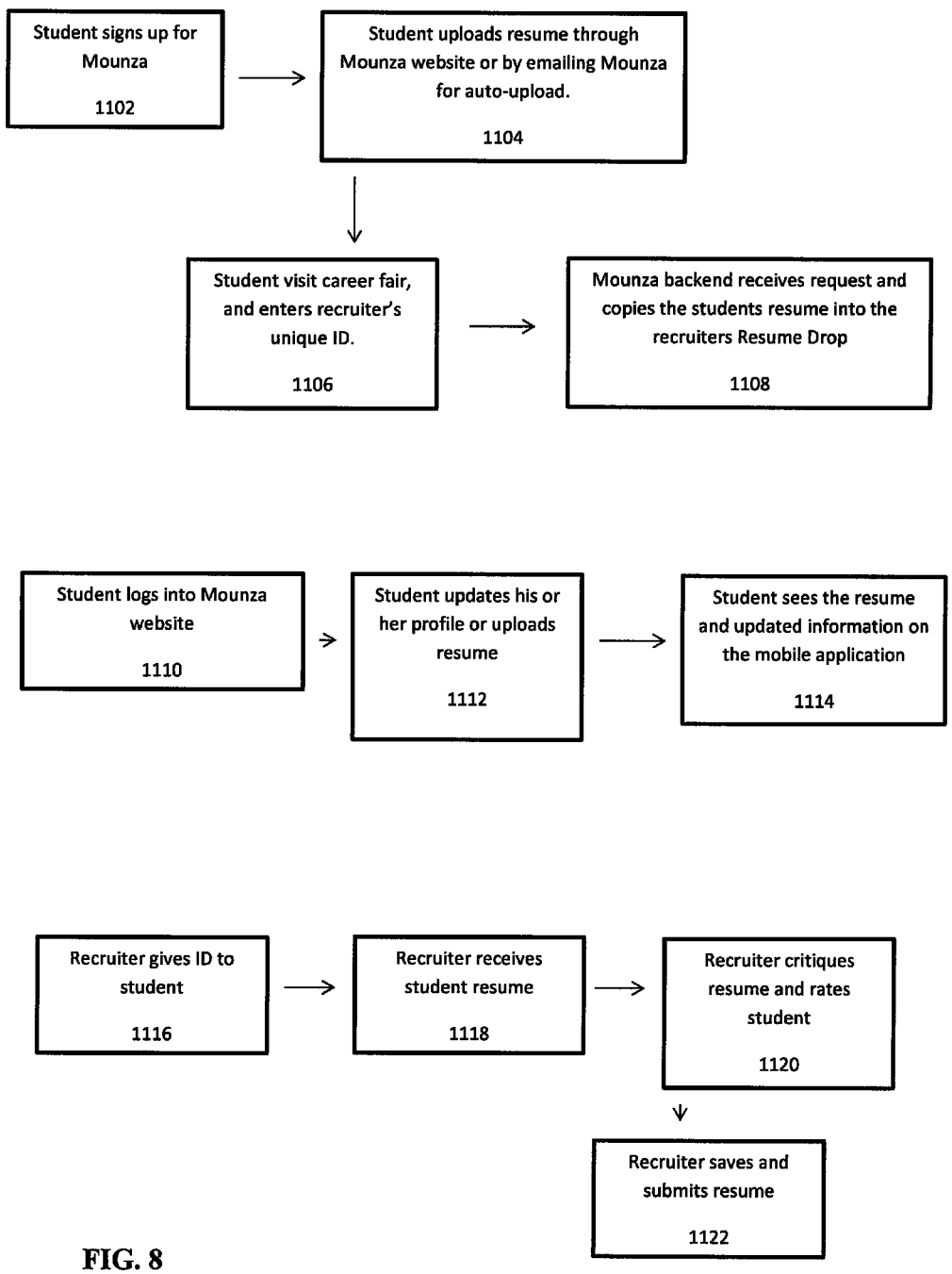
FIG. 8 is a flow diagram illustrating an overview of the process from a student perspective and a recruiter perspective, according to an embodiment.

FIG. 8 is a series of flow diagrams illustrating an overview of the process from a student perspective and a recruiter perspective, according to an embodiment. The student, upon signing up for the Mounza service (1102) can upload a resume through the Mounza website or by emailing the resume to Mounza for auto-upload (1104). This then allows the student to visit career fairs and enter the recruiters' unique Mounza service identifiers. The Mounza system then receives these identifiers and places copies of the student resumes into the recruiters ResumeDrop. When the student logs into the Mounza service website (1110), the student can update their profile information and upload additional resumes through the website (1112). The new information and updated resume will then appear on the student's mobile application (1114).

In an embodiment, the system includes an analytics engine (not shown) that analyzes data items from the documents and their contexts and produces various statistical data for users. For example, some statistics students are interested in include the following:

A recruiter user can give his or her ID to a student as previously described (1116). The recruiter then receives a resume from the student (1118). The recruiter then critiques and rates the student applicant and their resume (1120). The recruiter can then save the resume and submit it for further review (1122), all from the Mounza service mobile application.

Most/least visited booths at a job fair;
Jobs receiving the most/fewest applications;
Which applications received a response and time for employer to respond;
Number of different academic majors that have applied for a specific job; and
Top liked gifts at a given booth.

Some statistics recruiters are interested in include the following:

Students classified as "No", but considered "Yes" at another firm (firm to be secret);
Percentages of students (By Major, Year, etc.) that were allowed apply to for a given job;
Percentage of applicants for a job determined to be viable candidates;
Number of times a student has applied for a job; and
Number of times a student has visited in a week/month/school year.

These statistics are merely examples of types of information that can be generated, and are not meant to be exclusive.

Figure 9:
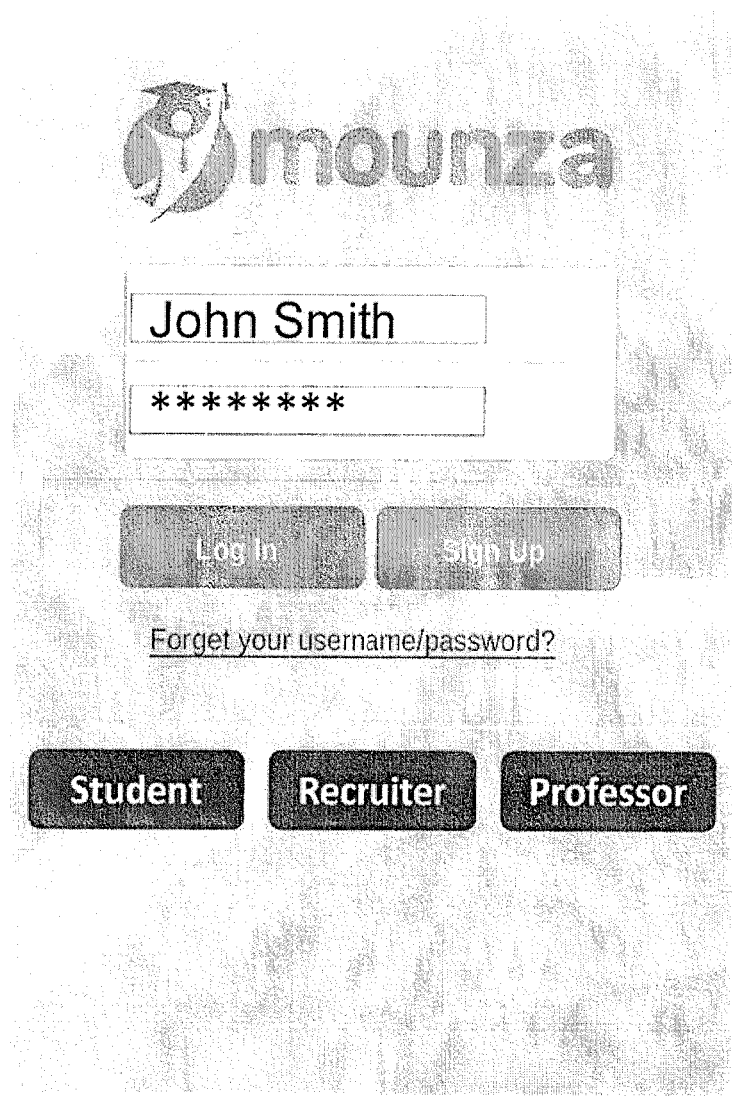
FIG. 9 is a diagram of a login screen according to an embodiment.

FIG. 9 is a mobile login screen for student, recruiter and professor users. For those that are members of the service, the user will need to provide their already established login identification and password. For new users there is an option to sign up for the service through the mobile device. In the event an existing user loses their username and password there is an option for retrieving that as well.

FIGS. 10-53 illustrate mobile device screens for students, recruiter and professor users using an embodiment of the invention.

Figure 10:
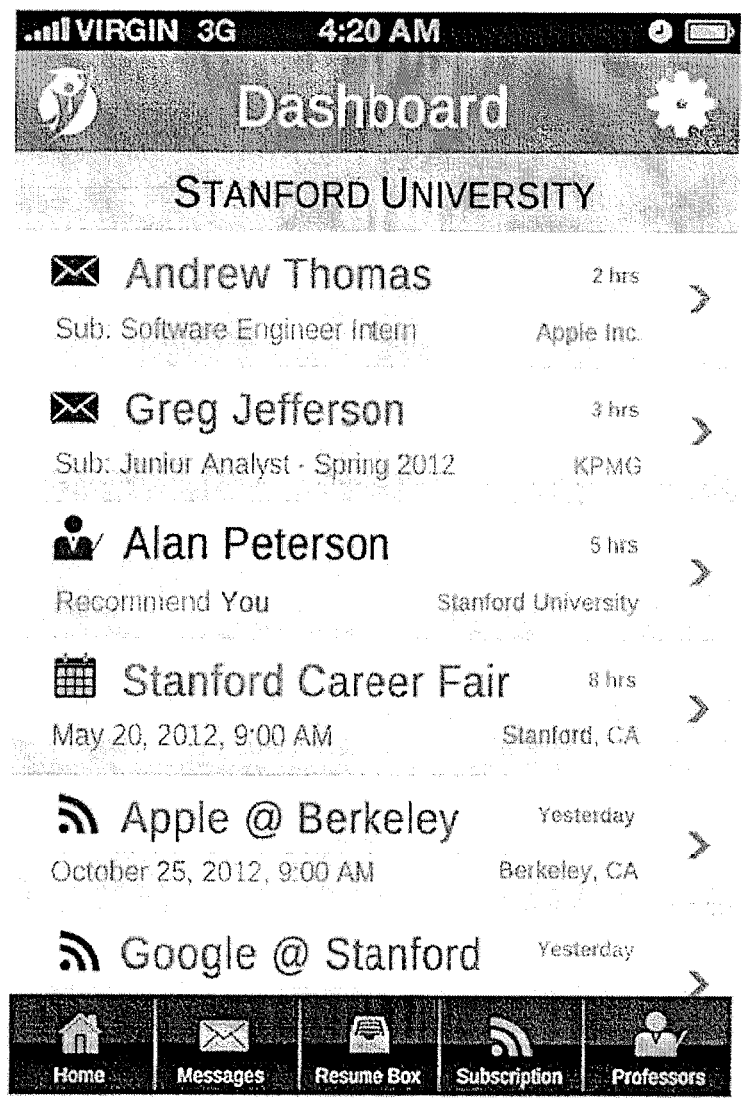

FIG. 10 shows the home screen or dashboard for a student user. This screen helps the student navigate to other parts and features of the mobile application. This screen displays in order of age new events, messages from recruiters, career fairs and other information that the student has subscribed to or selected to be informed about. In various embodiments, the dashboard can alternatively or additionally display buttons to view specified information, such as "all upcoming events", "my career events", recommended events", etc.

Figure 11:
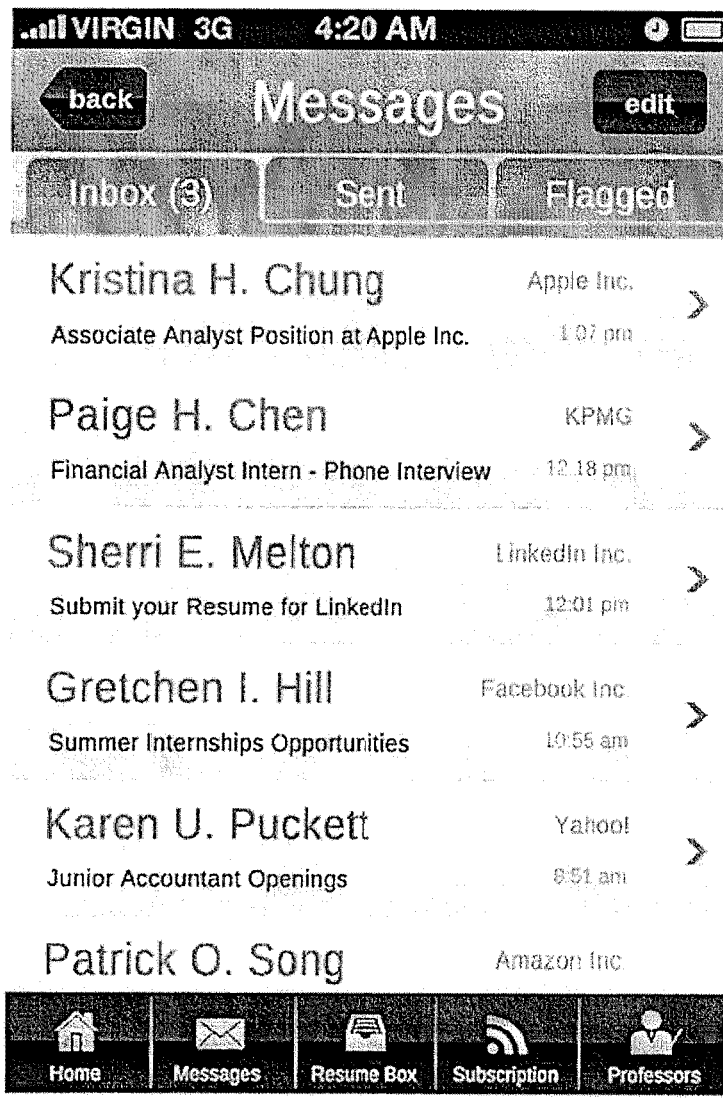

FIG. 11 shows the student's messages or conversations screen. The user can access this page by clicking the messages button or tab at the bottom of the mobile application. The messages screen includes options to view the student's inbox of received messages, the student's outbox of sent messages, and messages that have been flagged by the student for further review. The message previews contain information regarding the name of the sender or recipient, the employer and position the message regards and the time the message was sent or received.

FIG. 12 shows how a message or conversation appears on the mobile application. In addition to being able to see the whole message the user can delete or reply to a message directly from this view. The message or conversation as it appears can be accessed through the student's message screen shown in FIG. 11 by selecting that message.

Figure 13:
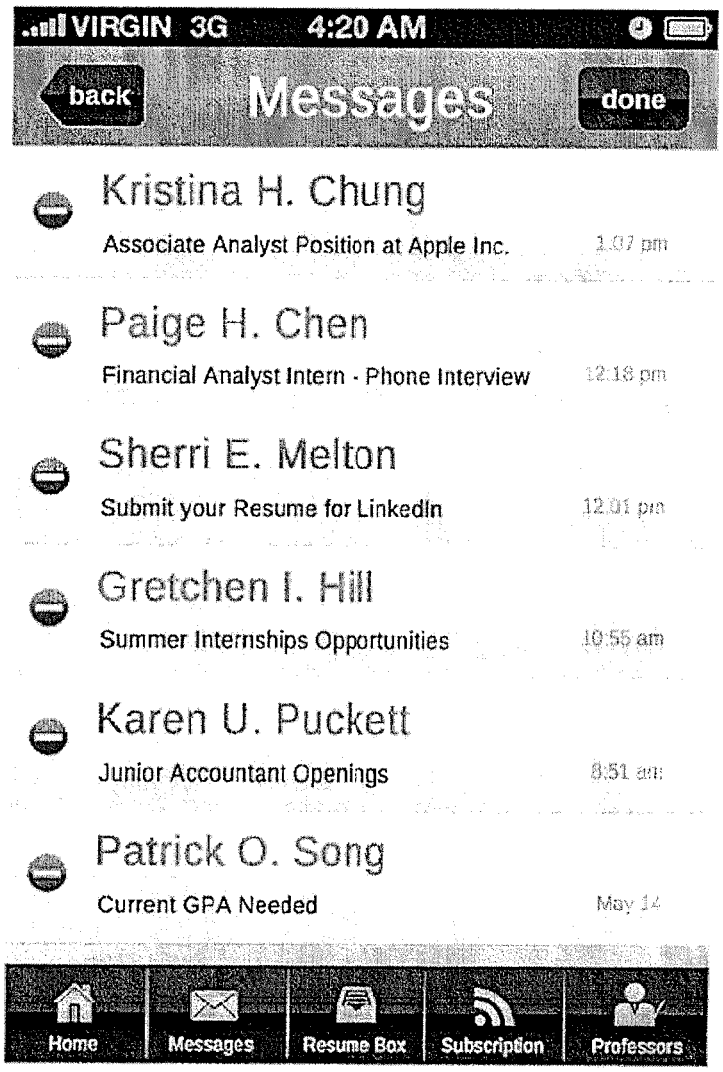

FIG. 13 demonstrates how messages can be deleted from the message inbox. When a user is on the main message screen and presses the edit button in the top right hand corner minus signs appear next to the messages. When the user clicks the minus sign the message will be deleted. When the user presses the back or done buttons the user is redirected back to the inbox.

Figure 14:
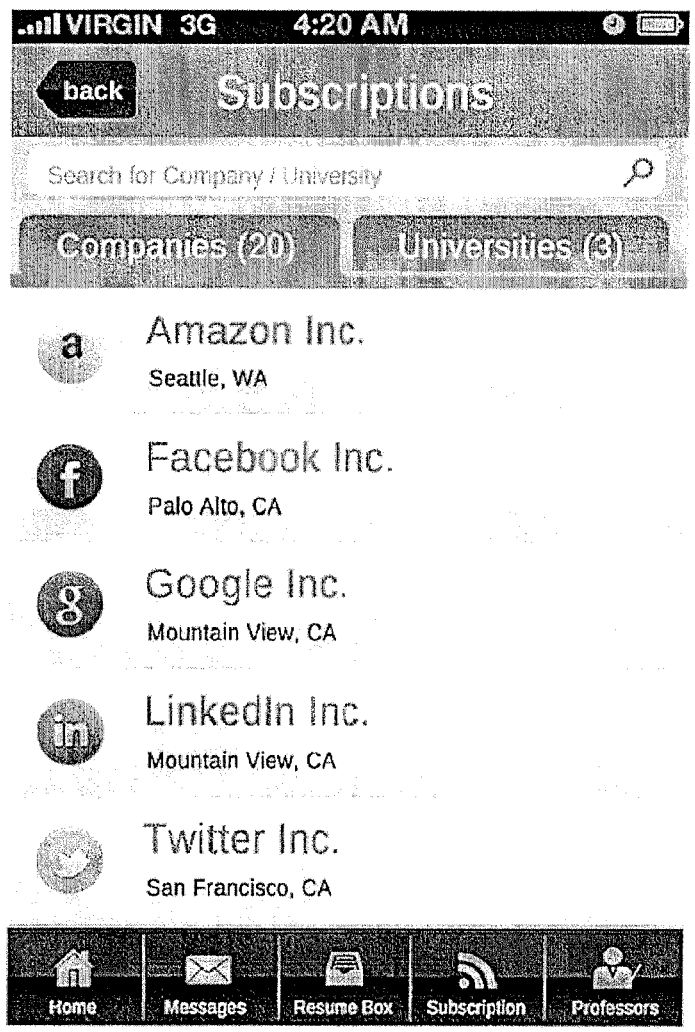

FIG. 14 shows the student subscription screen. Subscriptions allow students to get updates and information regarding specific companies or universities as they become available. As shown, a list of companies the student can subscribe to are available for browsing and selection. The search bar at the top of the screen allows the user to search for specific companies or schools they would like to subscribe to.

Figure 15:

FIG. 15 shows information on a specific employer regarding when they will be present at a student's university and the jobs they are hiring for. On this screen when the school tab is chosen the student is shown what career fairs and talent scouting events an employer will attend at their university. In addition to viewing the date and time of the fair, the student can directly convey whether they are attending an event by pressing the attend button next to the event. This view can either be accessed from the information feed on the student home screen or from the subscriptions page directly.

Figure 16:
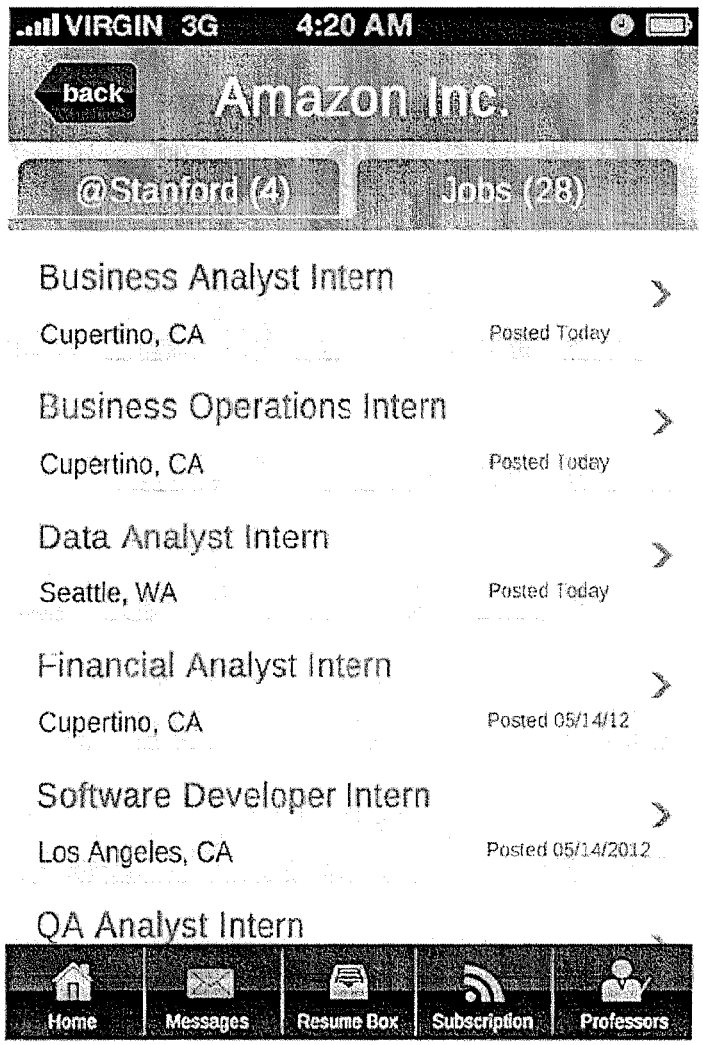

FIG. 16 is the same screen as FIG. 15 except with the jobs tab instead of the school tab chosen. The jobs tab shows what positions the employer is seeking to fill at the job fairs and recruiting events taking place listed on the school tab.

Figure 17:
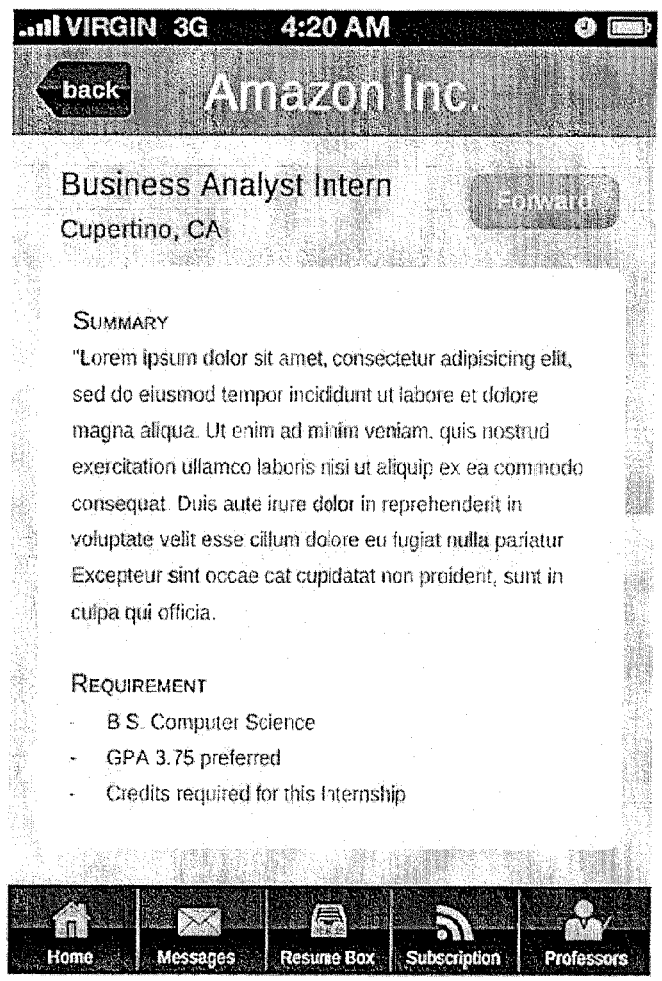

FIG. 17 shows what a specific open position or job posting looks like for student user. At the top of the screen it states the employer name and below that the position and its geographic location. A summary of the position and the basic requirements for the applicant are listed as well. The student can forward the job posting to another user by pressing the forward button on the top right of the posting.

Figure 18:
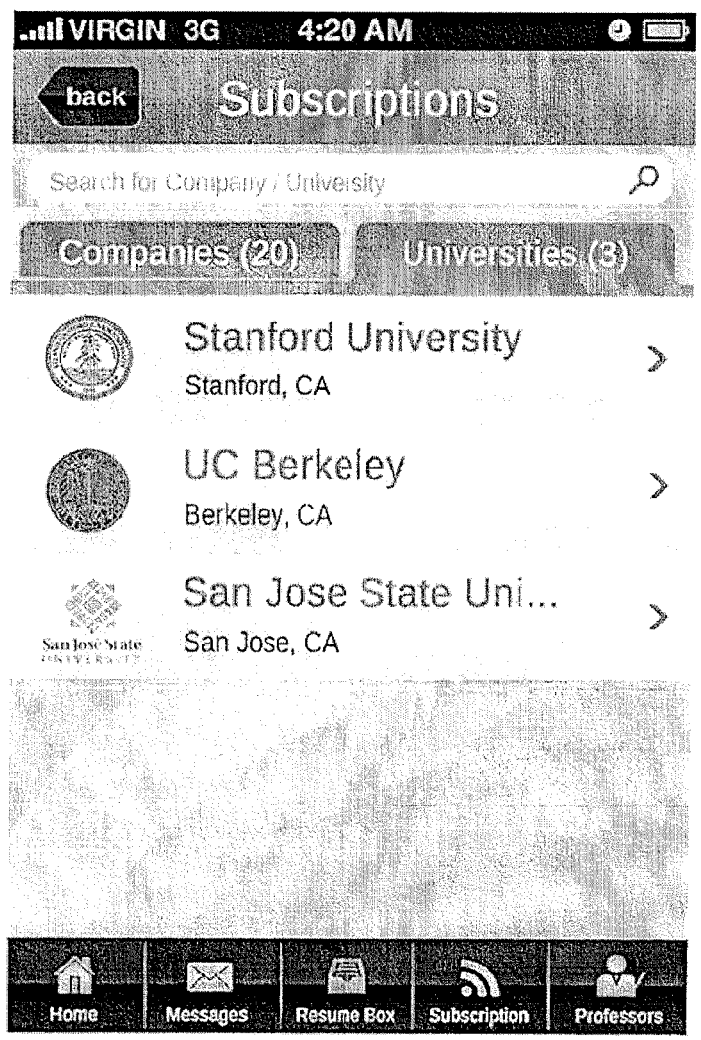

FIG. 18 shows the universities tab as it appears in the subscription section of the mobile application. The universities tab allows the student to see all the career fairs occurring at a particular university.

Figure 19:

FIG. 19 shows a view of a specific universities career and recruiting fair schedule. This view will also show some specific information about the university and allow the student to add a recruiting event to their calendar directly.

Figure 20:

FIG. 20 shows a view of a specific recruiting event or fair's information page on the mobile application. This view can be accessed by either clicking on a particular university's career fair list from the subscriptions screen or by clicking the actual recruiting event as it appears on the home screen information feed. This information page allows the student to read the description of the event, its time and date and the specific location of the event on the campus provided at the top of the screen. The student can also add the fair to event reminders or calendar, forward the event information to another user, or view a list of the companies present at the fair.

Figure 21:
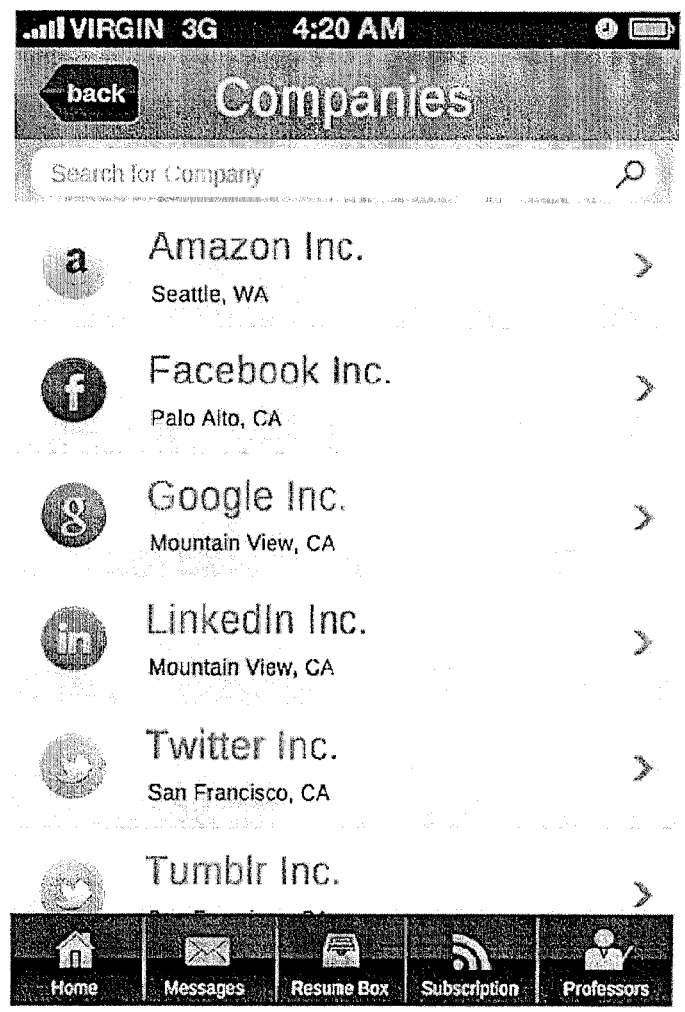

FIG. 21 shows the list of companies present at a specific fair listed alphabetically. The user can also search for a specific company by using the search bar at the top.

Figure 22:
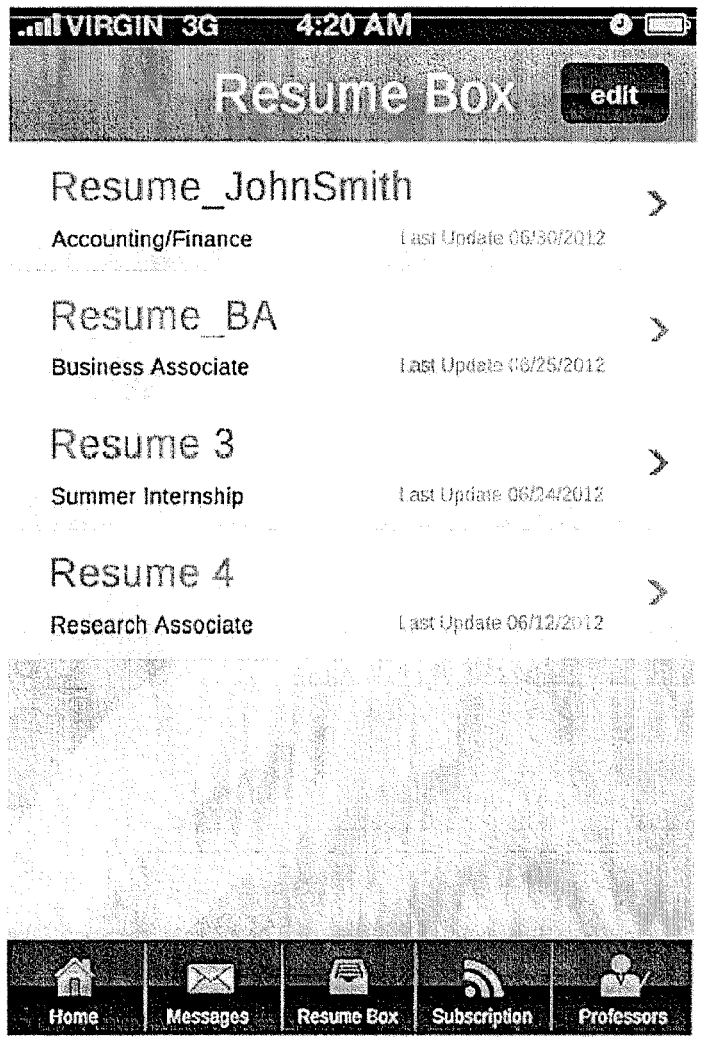

FIG. 22 demonstrates the resume box screen for a student user. The resume box screen can be accessed by clicking the resume tab at the bottom of the mobile application. This screen contains a list of all the resumes the student has uploaded to the Mounza platform. The resumes can have custom names and can be classified by position for easy access. If the user wants to preview a resume they can press it and be sent to the preview screen shown in FIG. 24.

Figure 23:
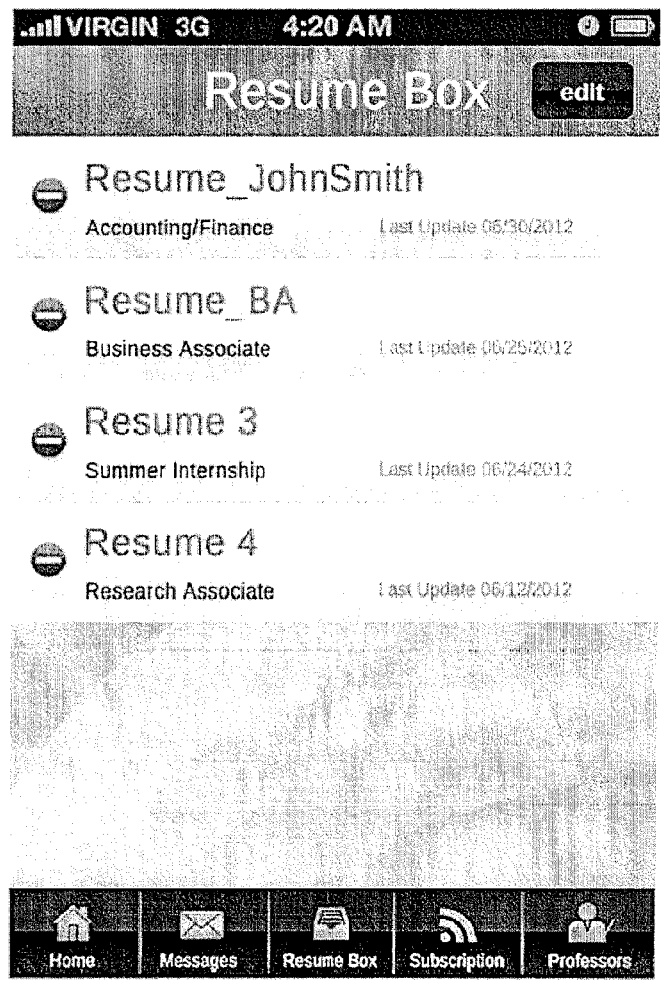

FIG. 23 demonstrates the resume box screen in edit mode. When the edit button is pushed at the top of the screen it allows a user to delete resumes in their resume box from the mobile application.

Figure 24:
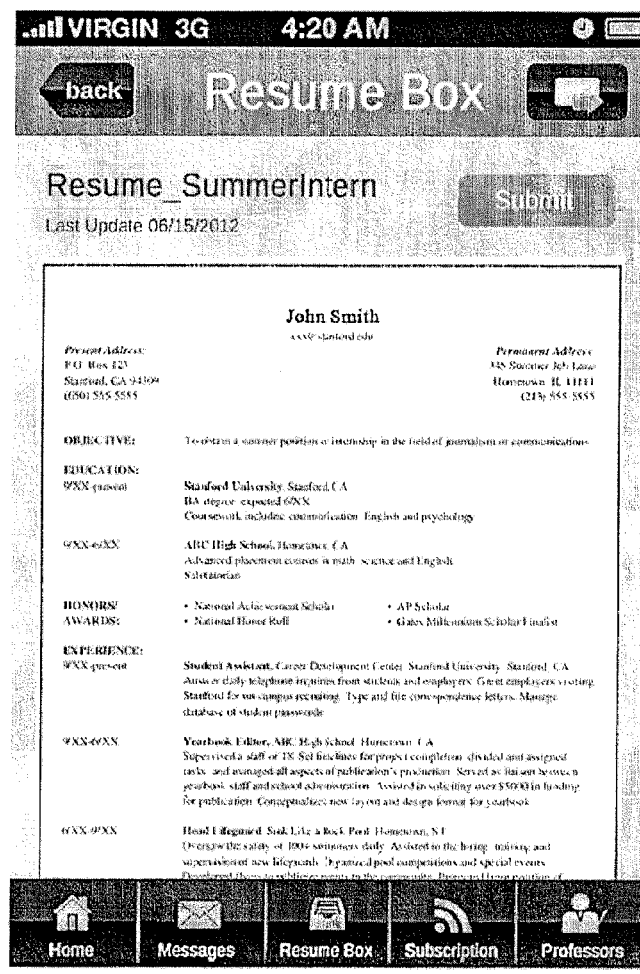

FIG. 24 shows a student view of the resume that has been chosen to view from the resume box in FIG. 22. When a user is viewing a resume they can see the full text of the resume, select to submit it to a current job posting or select to forward the resume through a message or conversation to a specific recruiter or user.

Figure 25:
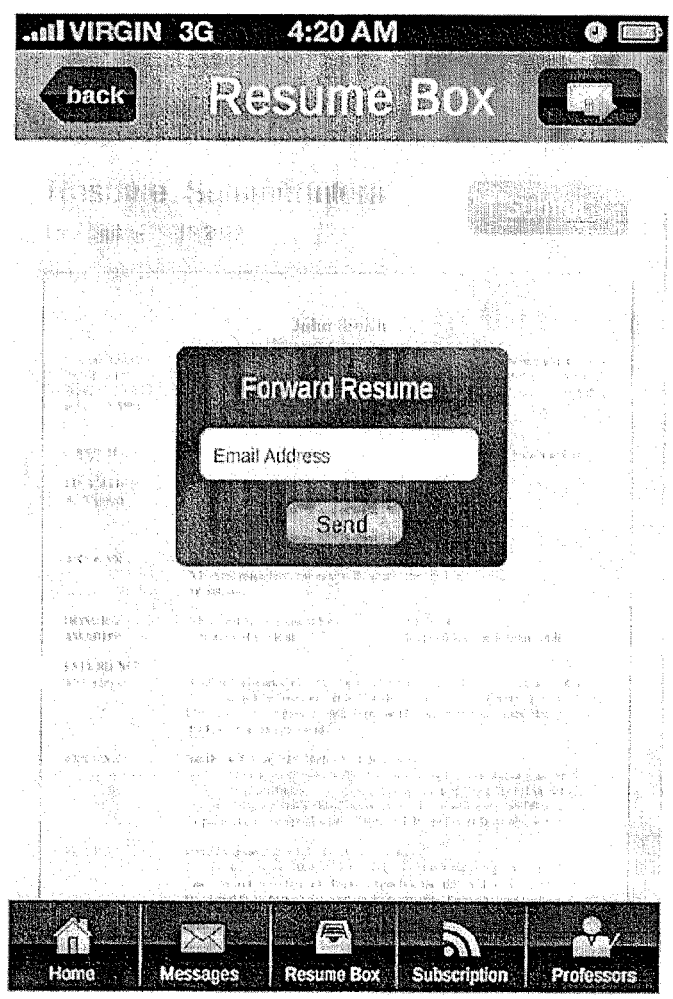

FIG. 25 shows the dialogue box that appears when a student selects to forward a resume they are viewing from their resume box. When the forward option is chosen the application prompts the user to provide a recipient email address.

Figure 26:
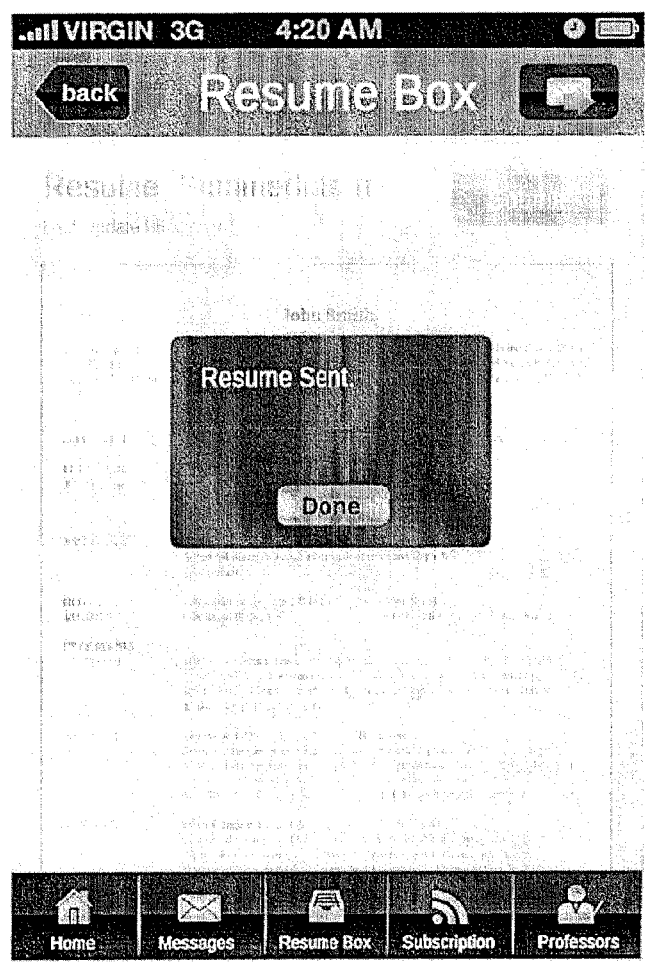

FIG. 26 demonstrates the confirmation that a student receives after the student enters a valid recipient to forward their resume to.

Figure 27:
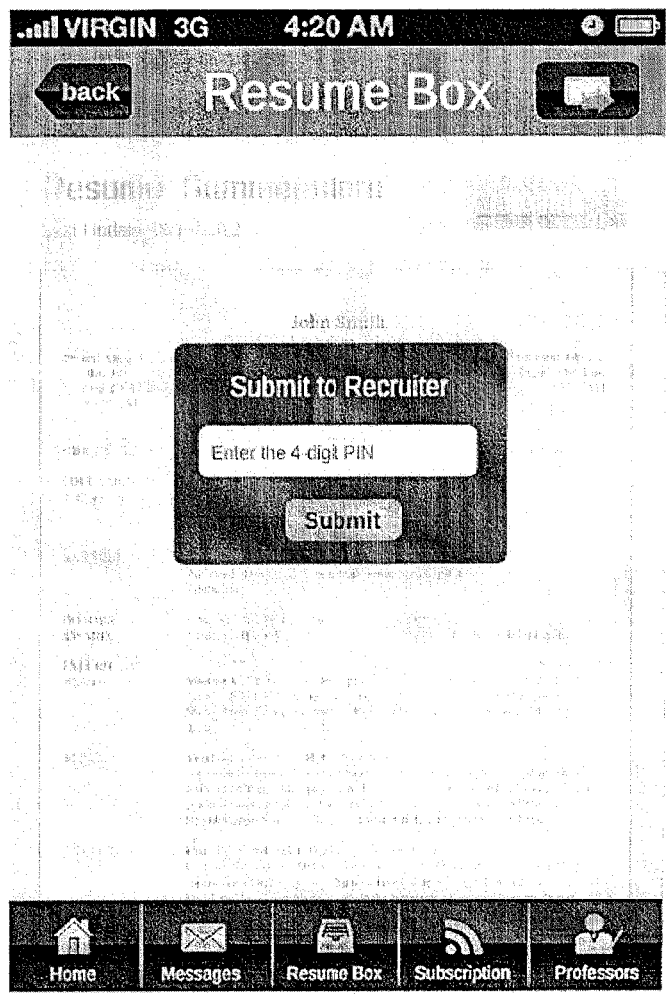

FIG. 27 shows the dialogue box that appears when a student selects to submit a resume to a recruiter. Once the student selects the submit option in FIG. 24 the application prompts the user to provide a recruiters unique Mounza identifier.

Figure 28:
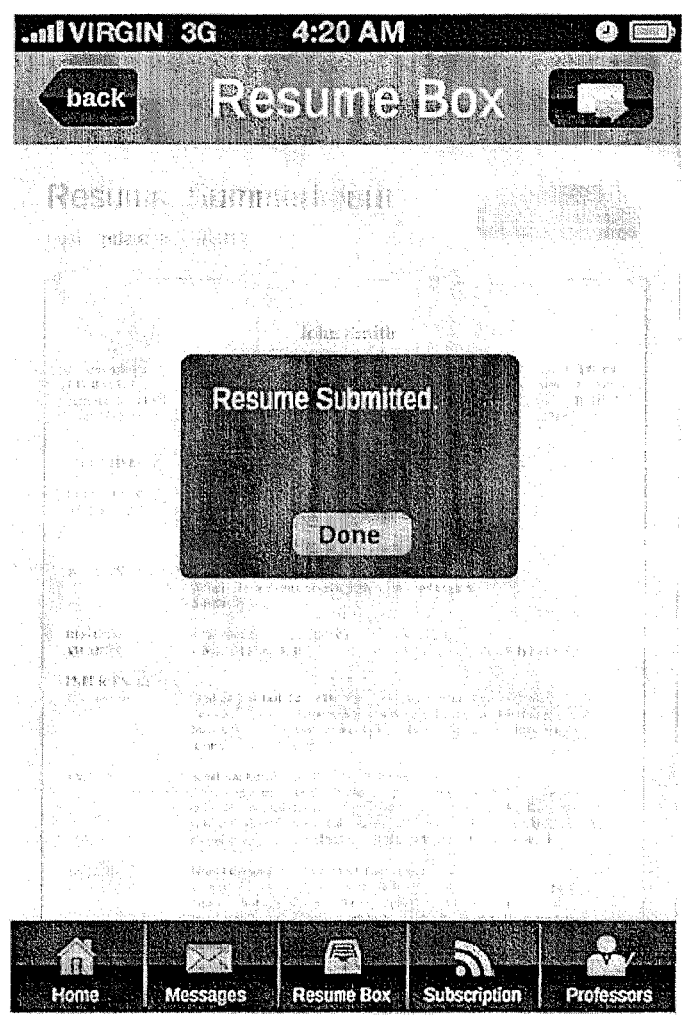

FIG. 28 demonstrates the confirmation that a student receives after the student enters a valid recruiter identifier for their resume to be submitted to.

Figure 29:

FIG. 29 is a view of the professor screen that a student can access by pressing the professor tab at the bottom of the mobile application. This screen allows the user to view a list of professors at a specific university by name and academic area. The user can select to contact a professor by pressing the contact button to the right of each of their names.

Figure 30:
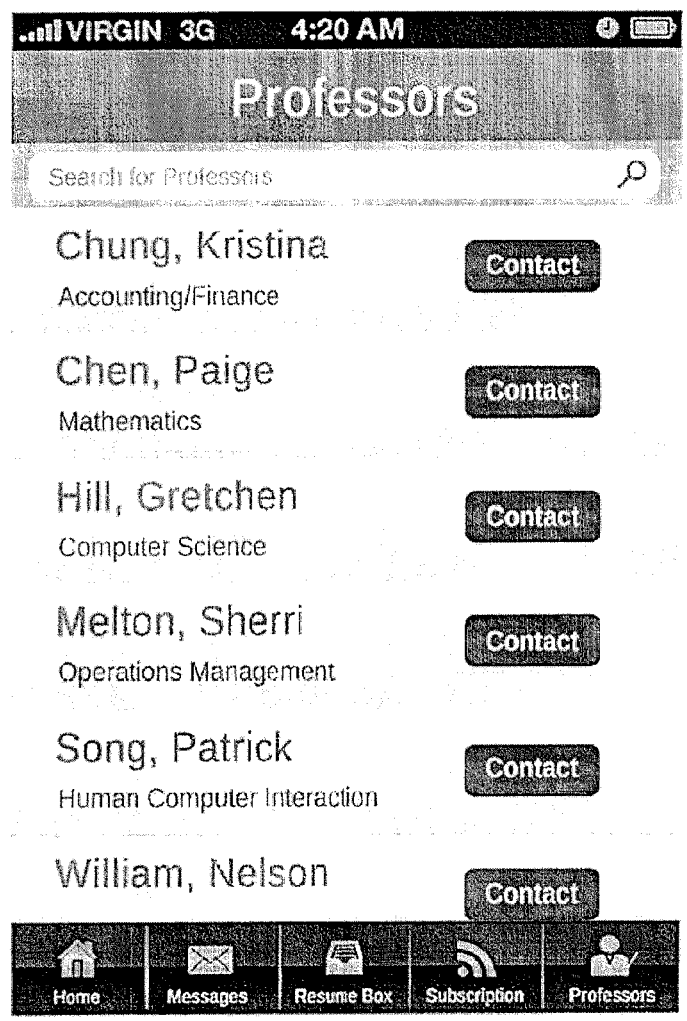

FIG. 30 is the same professor screen as FIG. 29, but in addition this figure demonstrates the search bar function where a student can search the list of professors manually.

Figure 31:
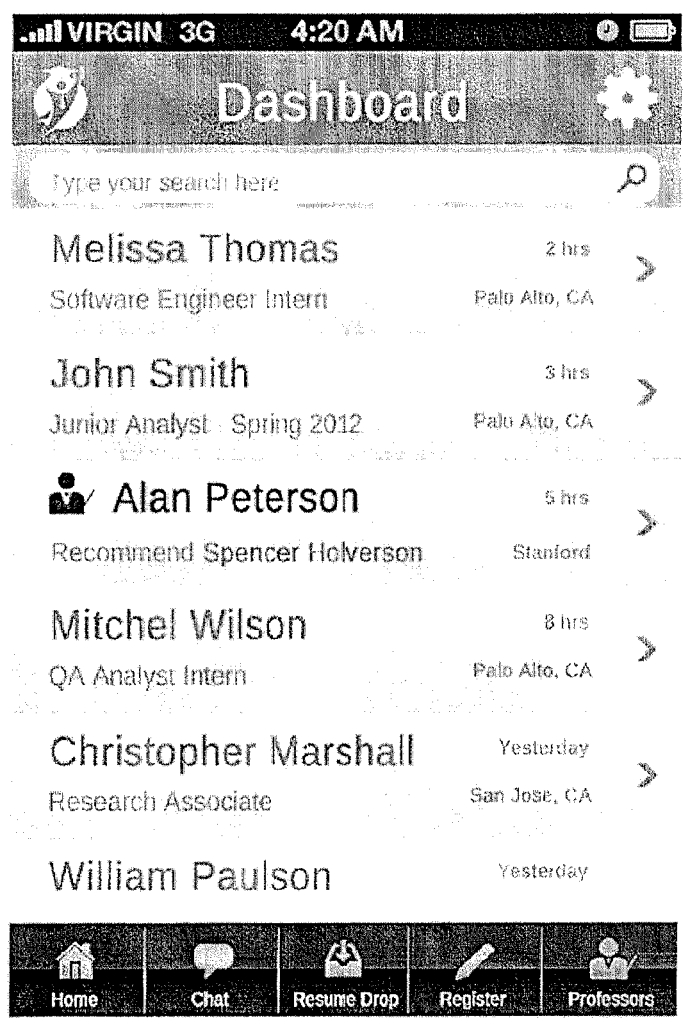

FIG. 31 shows the dashboard or home screen for the recruiter user. The dashboard screen helps the recruiter to navigate to any section of the application. Below a search bar there is an information feed which displays relevant applicant messages, resumes and recruiting related events organized by date. This screen is the recruiter's equivalent to the student dashboard or home screen. This is the first screen that a recruiter sees after signing into the application through the login screen shown in FIG. 9.

Figure 32:

FIG. 32 shows an applicant summary for a student whose resume was submitted or shared with the recruiter user. The summary tab shows the educational institution of the student, their grade point average and a quick synopsis of the student applicant's experience listed in their resume. The recruiter can also choose to view the student's full resume or forward the resume to another user for review.

Figure 33:
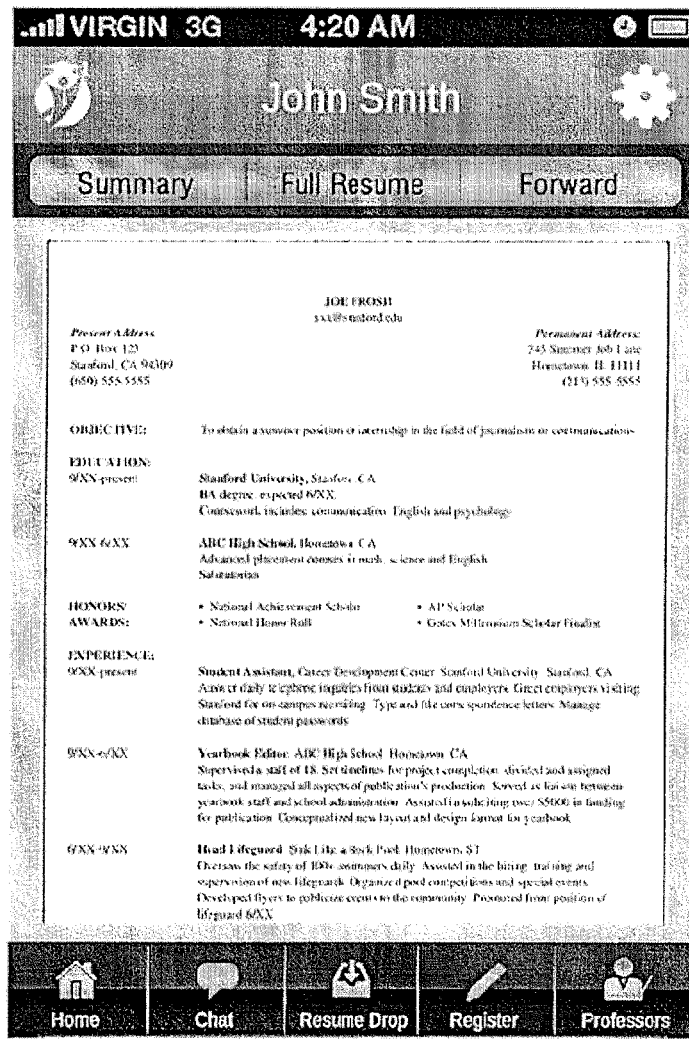

FIG. 33 shows the full resume tab of the applicant summary screen shown in FIG. 32. The full resume can be viewed in its uploaded form by the student. The recruiter can also forward the resume while viewing the applicant's full resume.

Figure 34:
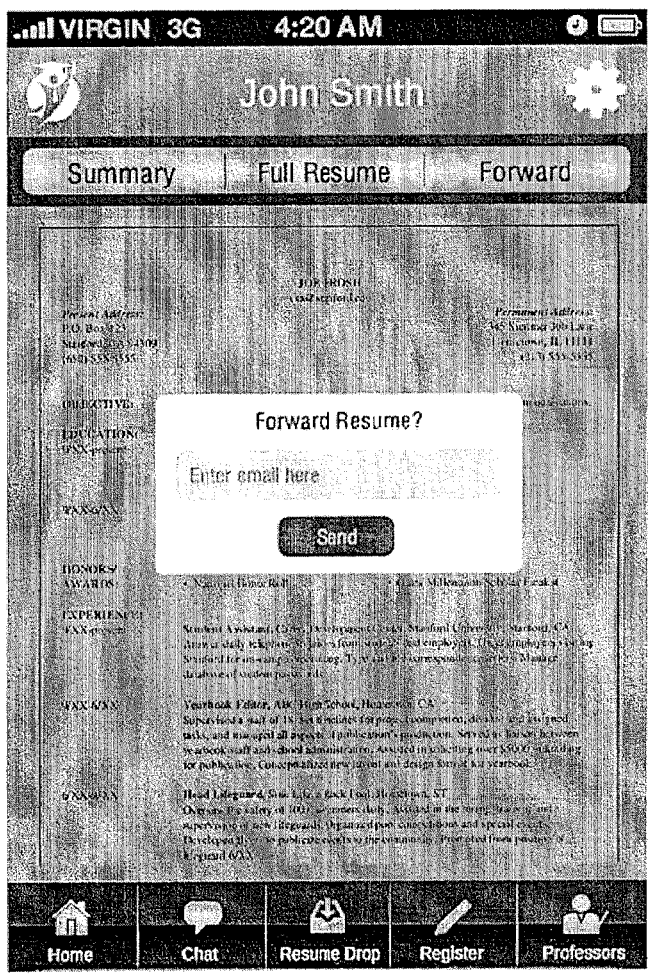
Figure 38:
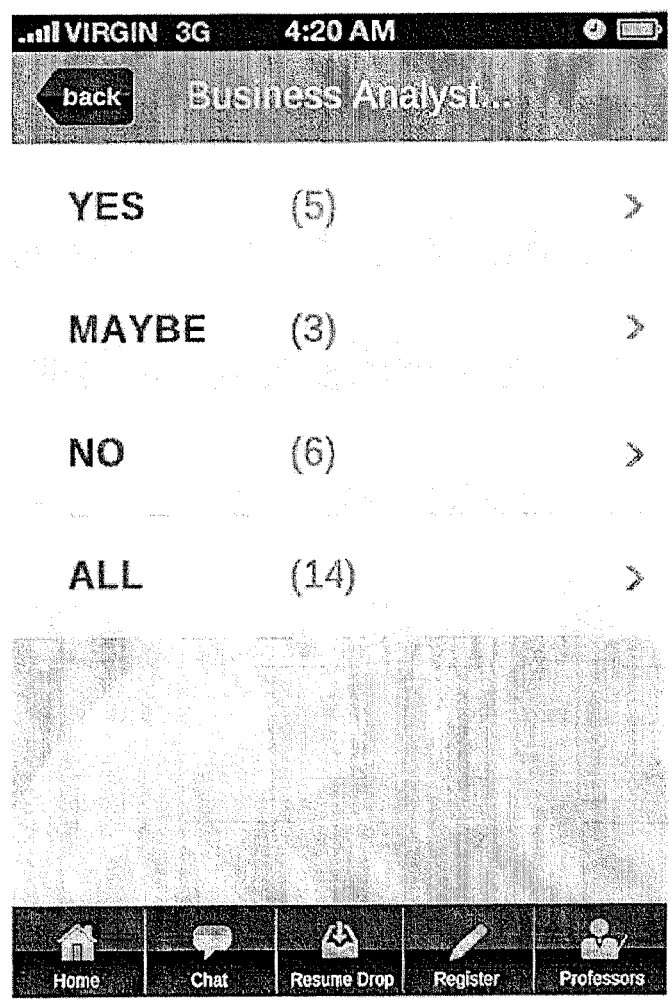

FIG. 34 shows the dialogue box that appears when a recruiter selects to forward a resume from the applicant summary screen shown in FIG. 38 or the full resume tab shown in FIG. 33. When the forward option is chosen the application prompts the user to provide a recipient email address.

Figure 35:
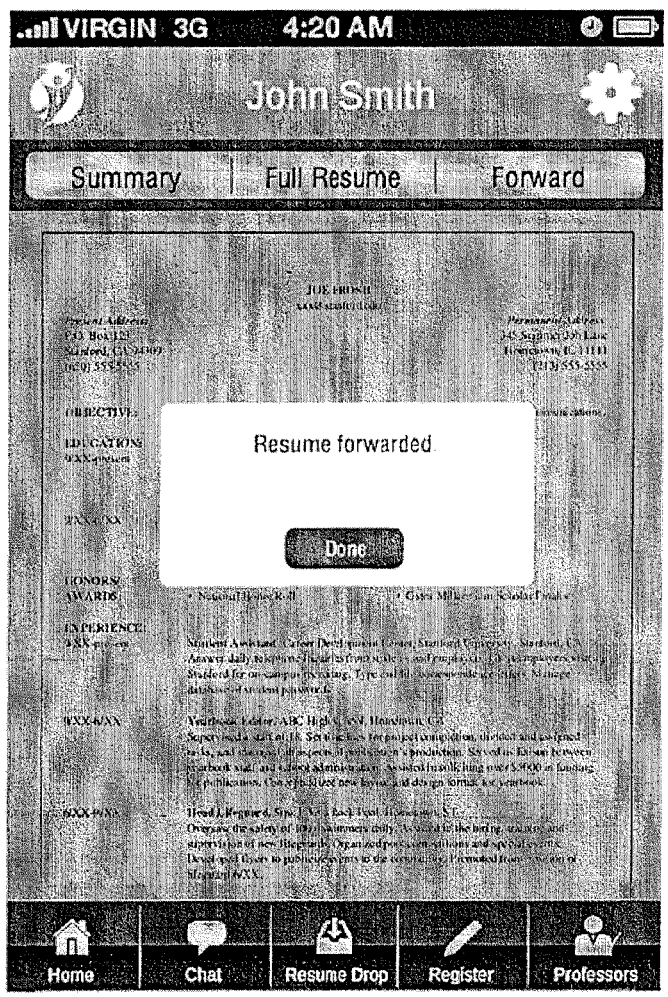

FIG. 35 demonstrates the confirmation that a recruiter user receives after the recruiter enters a valid recipient to forward the applicants resume to.

Figure 36:
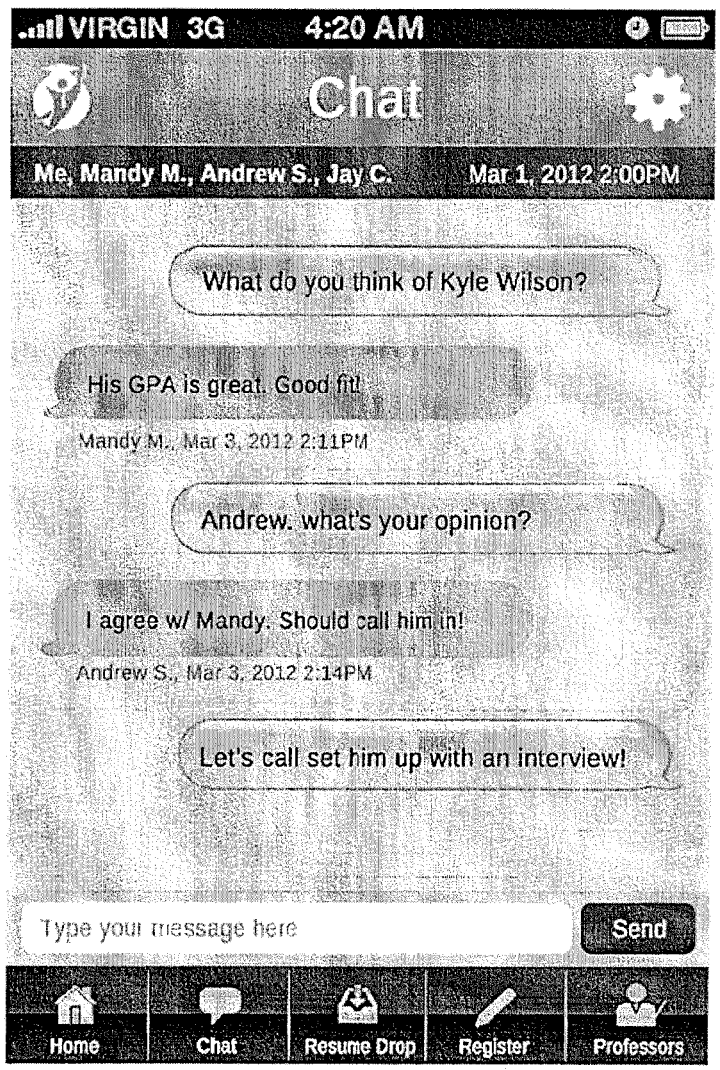

FIG. 36 shows the chat screen that recruiter users can access anytime by pressing the chat tab at the bottom of the mobile application. The chat screen allows the recruiter user to discuss applicants and their prospects in a fluid and live discussion space rather than in a message or email inbox style idea exchange. The chat can include more than two recruiters at a time and will list the names of those in the conversation, and the time and date, at the top of the screen.

Figure 37:
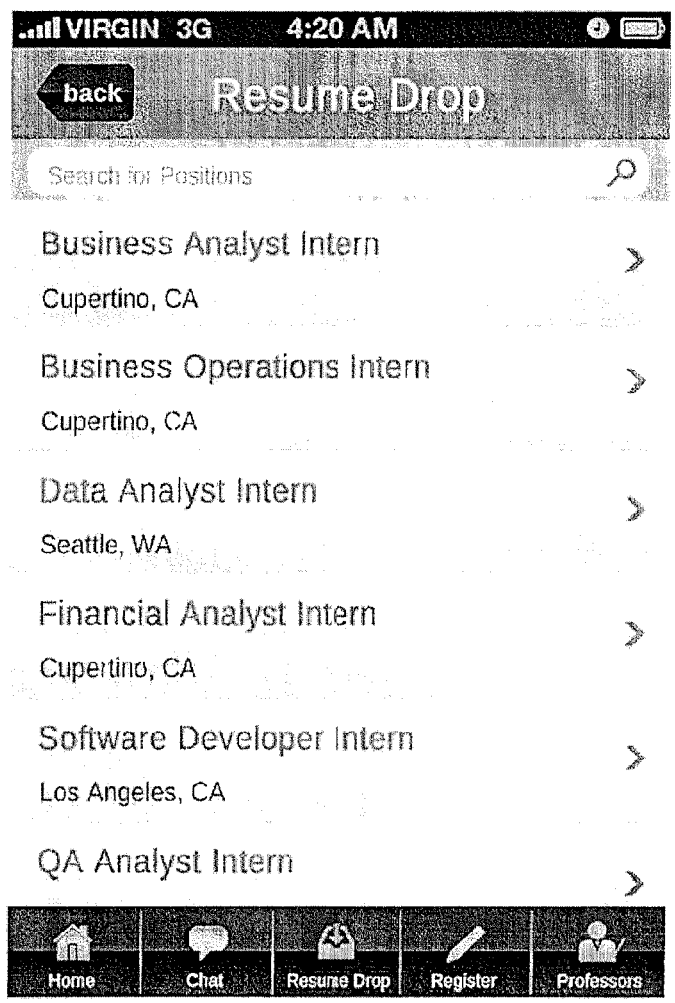

FIG. 37 shows the resume drop screen that a recruiter user can access by pressing the resume drop tab at the bottom of the mobile application. The resume drop screen allows the recruiter to view specific positions they have received resumes for. The positions and locations are listed. If the recruiter wants to see particular applicants and their resumes for a specific position they can press a position listed in the list. This screen also has a search function so the recruiter can find positions by name rather than by scrolling through the list of positions manually.

FIG. 38 demonstrates how resumes by students are classified for one available position chosen from the position list in FIG. 37. The recruiter can view the applicants by their categorization as "yes", "maybe" or "no" candidates. Or they can view all of the resumes they have received for this open position.

FIG. 39 shows what the resume review screen looks like for "yes" applicants as chosen from the resume classification screen for a specific posting. The recruiter can view the students whose resumes were select as a "yes" by the recruiter or their colleague. The applicants are listed by name, major and educational institution.

Figure 40:
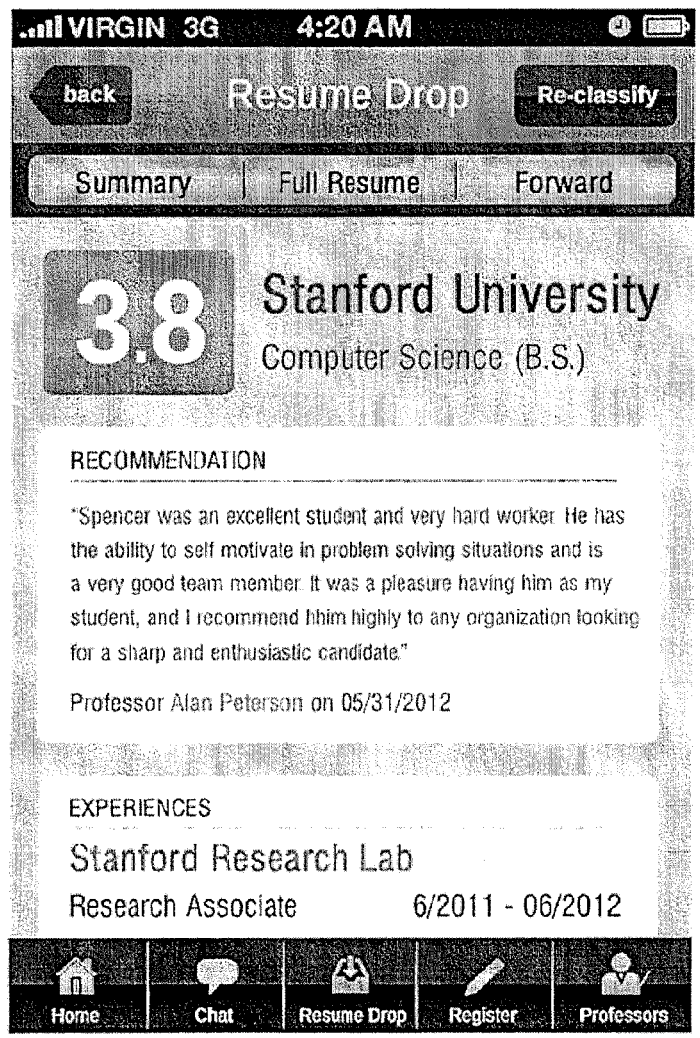

FIG. 40 shows an applicant resume retrieved from the recruiter's resume drop. The applicant summary includes a written recommendation by a professor if one has been made and provides the option for the recruiter to re-classify the applicant as demonstrated in FIG. 41.

Figure 41:
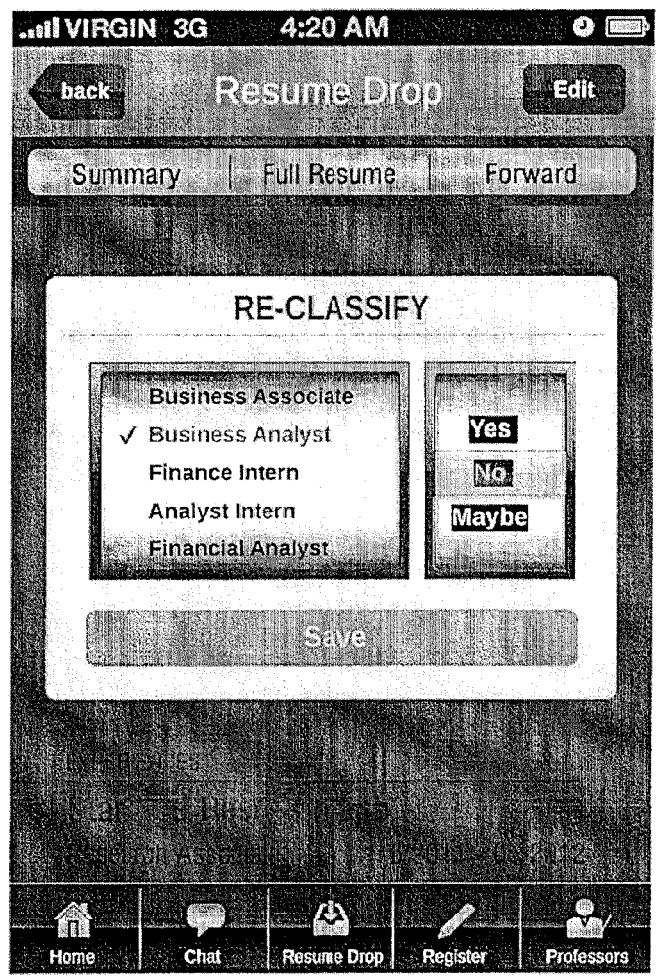

FIG. 41 demonstrates the ability of a recruiter to classify or re-classify a student applicant's resume in the resume drop tab for the recruiter user. The classification options allow for the recruiter to not only change the student from a "yes", "no" and "maybe" candidate, but to also re-classify the student as an applicant for a different position.

Figure 42:

FIG. 42 illustrates the register screen that can be accessed by recruiter users when pressing the register tab at the bottom of the mobile application. The register screen provides the recruiter with their unique identifier and a countdown for how long that unique identifier will last. The recruiter can also request a new identifier by pressing the get a new number button.

Figure 43:
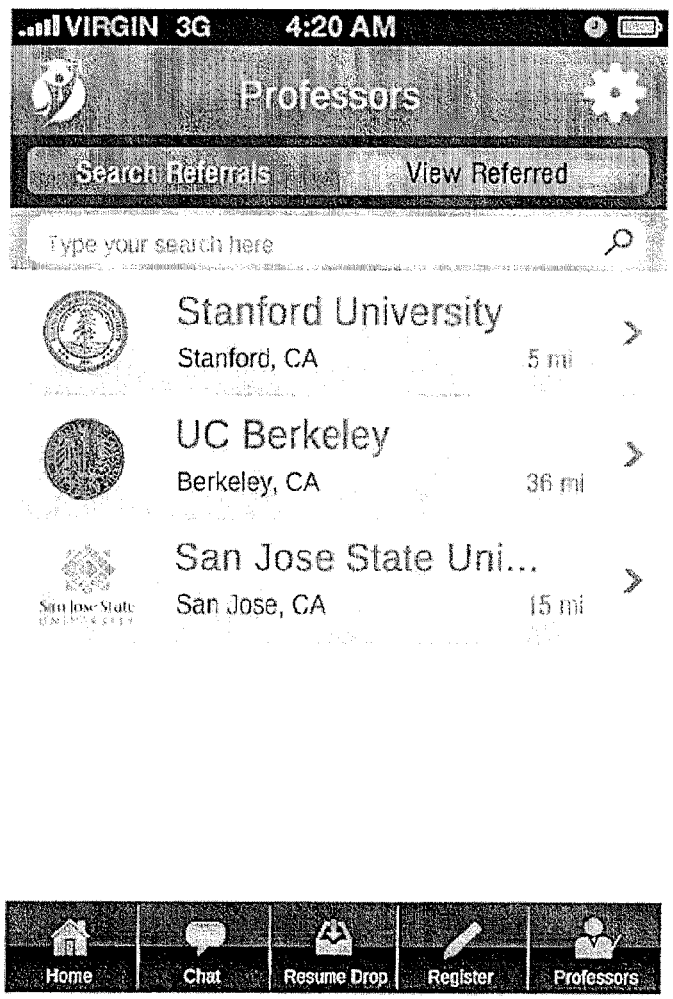

FIG. 43 shows the professors screen that can be accessed by recruiter users when pressing the professor tab at the bottom of the mobile application. The professors screen referrals tab shows the referrals made by professors categorized by their teaching institutions. If the recruiter user presses a university a list of referring professors from that institution will appear as shown in FIG. 44.

Figure 44:
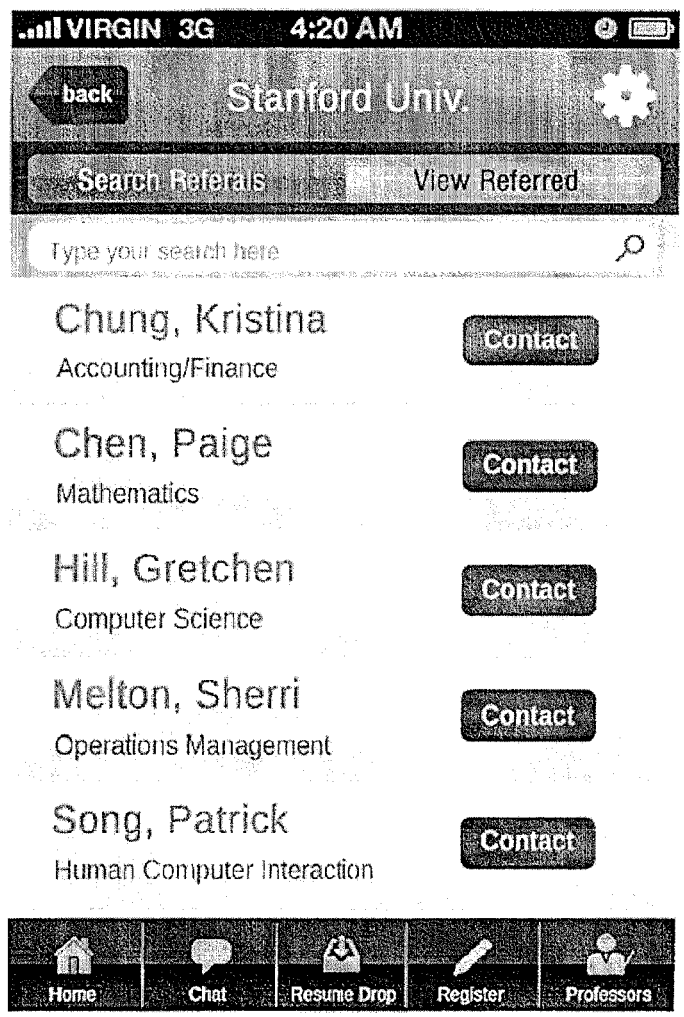

FIG. 44 shows the list of professors for that university organized by the name of the referring professor. The recruiter user can search for a specific professor through the search bar and can view the contact information of a professor by pressing the contact button next to their name. The professors teaching area is provided under their name in the alphabetical list.

Figure 45:
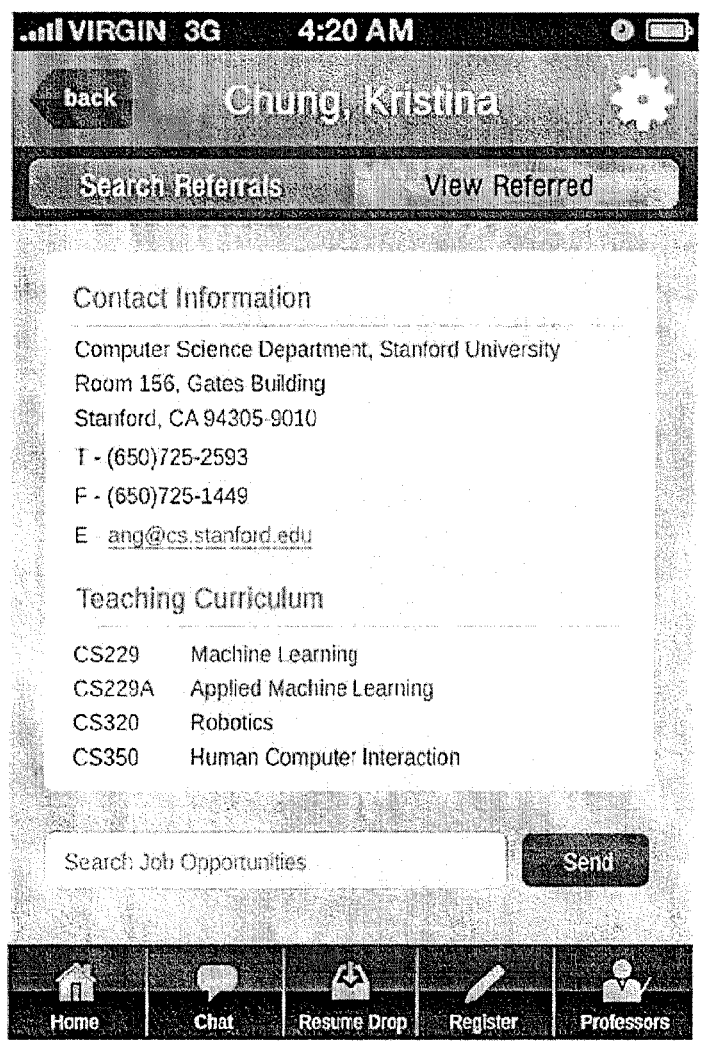

FIG. 45 demonstrates the contact information screen a referring professor once a recruiter user selects the professor from one of the referrals in the list shown in FIG. 44. The contact information including the address, phone and fax numbers, email address and teaching curriculum can all be viewed and shared.

Figure 46:
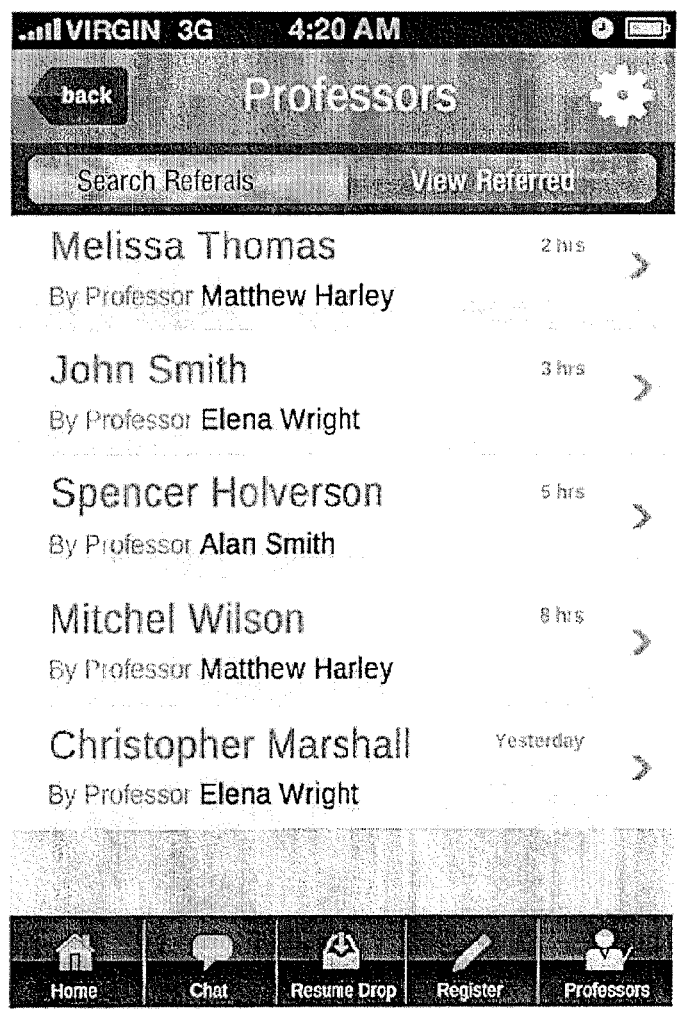

FIG. 46 shows the professor screen organized by student applicants and their referring professor. The recruiter user can press a specific student applicant to get to the professor recommendation made for that applicant that is shown in FIG. 47.

Figure 47:
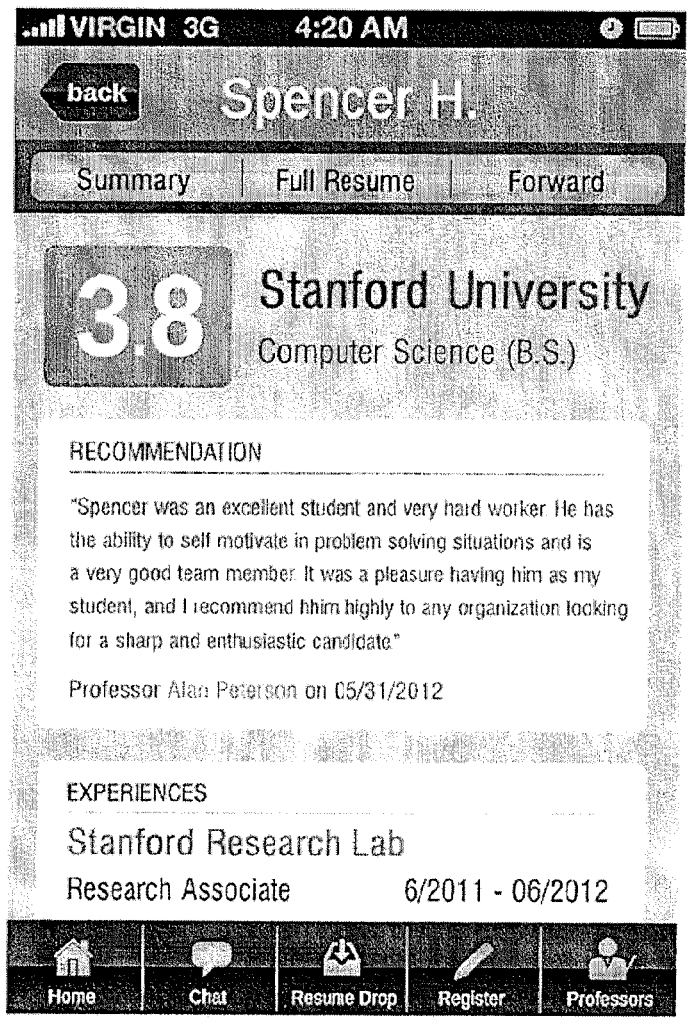

FIG. 47 shows a student applicant's summary with the text of the written recommendation made by the professor contained below the student grade point average and educational institution. The recommendation section includes the name of the professor and the date the recommendation was made.

Figure 48:
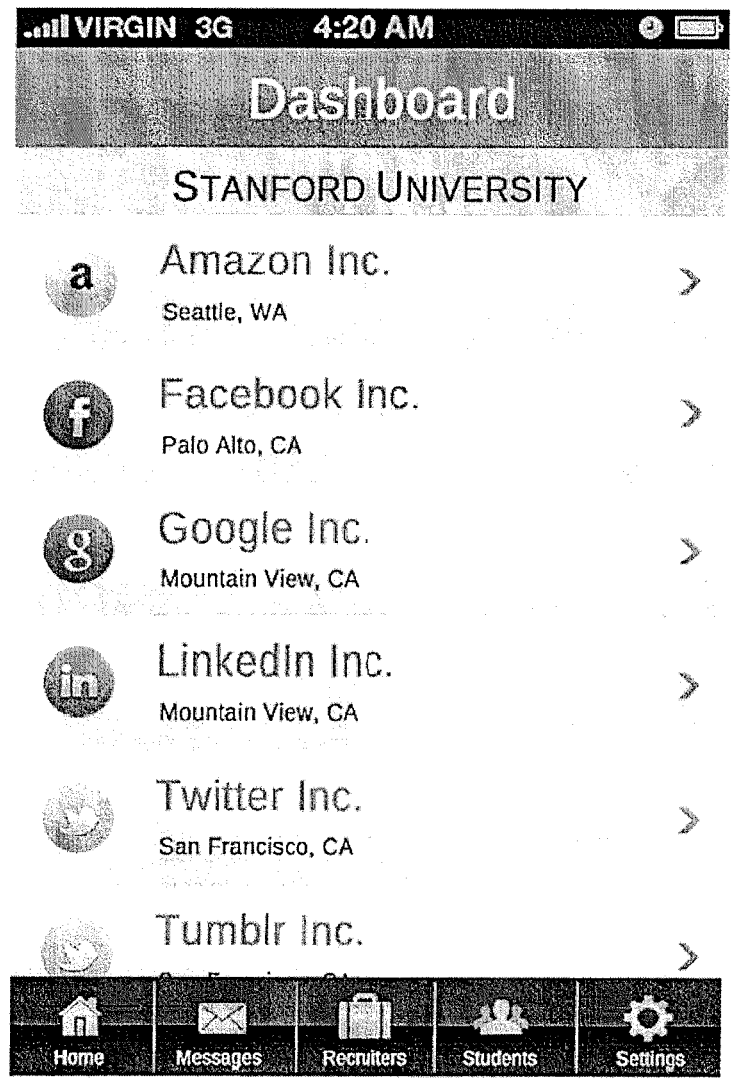

FIG. 48 shows the dashboard or home screen for the professor user. The dashboard screen helps the professor to navigate to any section of the application. The professor user sees the name of their teaching institution at the top and a list of employers who are recruiting at their institution below. This screen is the professor equivalent to the student dashboard or home screen. This will be the first screen that a professor sees after signing into the application through the login screen shown in FIG. 9.

Figure 49:

FIG. 49 shows the list of recruiters from a specific employer that is visiting the professors teaching institution. The professor can navigate the list and press the contact button to view detailed contact information of the recruiter as shown in FIG. 50.

Figure 50:
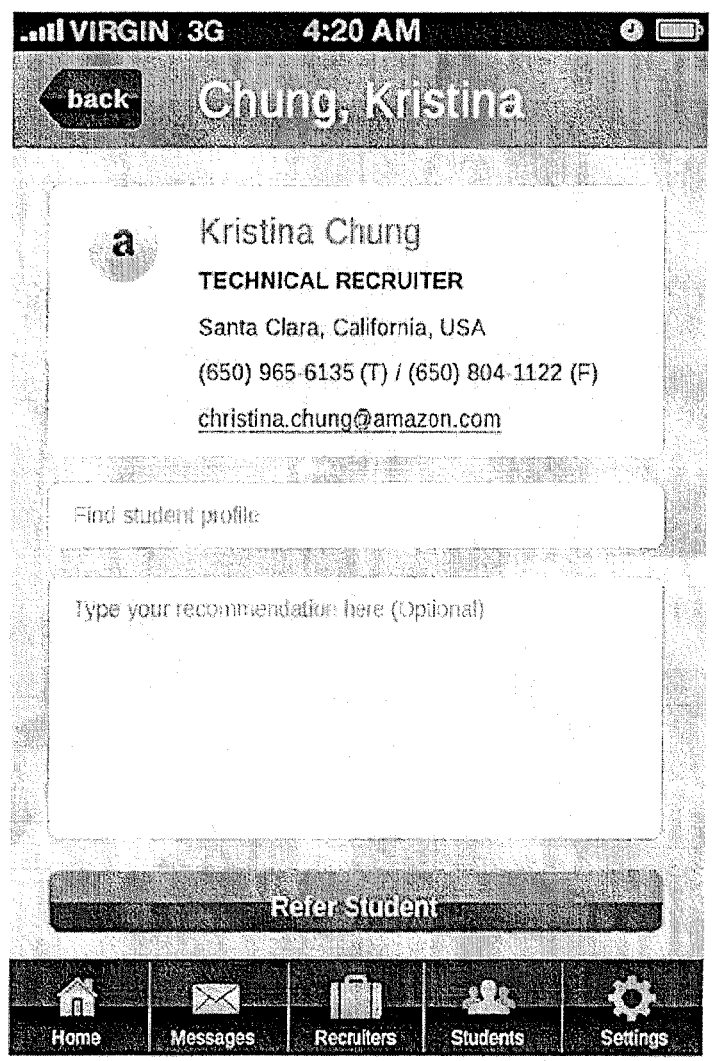

FIG. 50 shows the contact information for a specific recruiter. It contains the name of their employer, their location, the phone and fax number and email address so the professor can contact the recruiter directly. The professor can also refer a student directly to the recruiter by searching for or inputting a student's name and recommendation, and pressing the refer student button.

Figure 51:

FIG. 51 demonstrates the messages tab for a professor user. The messages tab contains the professor's inbox for received messages, outbox for sent messages and flagged messages that the professor would like readily accessible. The inbox is shown and lists the messages by the contact name and reason for contacting the professor. Students can send requests for referrals to professors, and recruiters can advertise openings they are seeking students for.

FIG. 52 shows an opened message from the FIG. 51 professor message screen. The message contains the name of the sender, a subject line and the request or message content itself.

Figure 53:
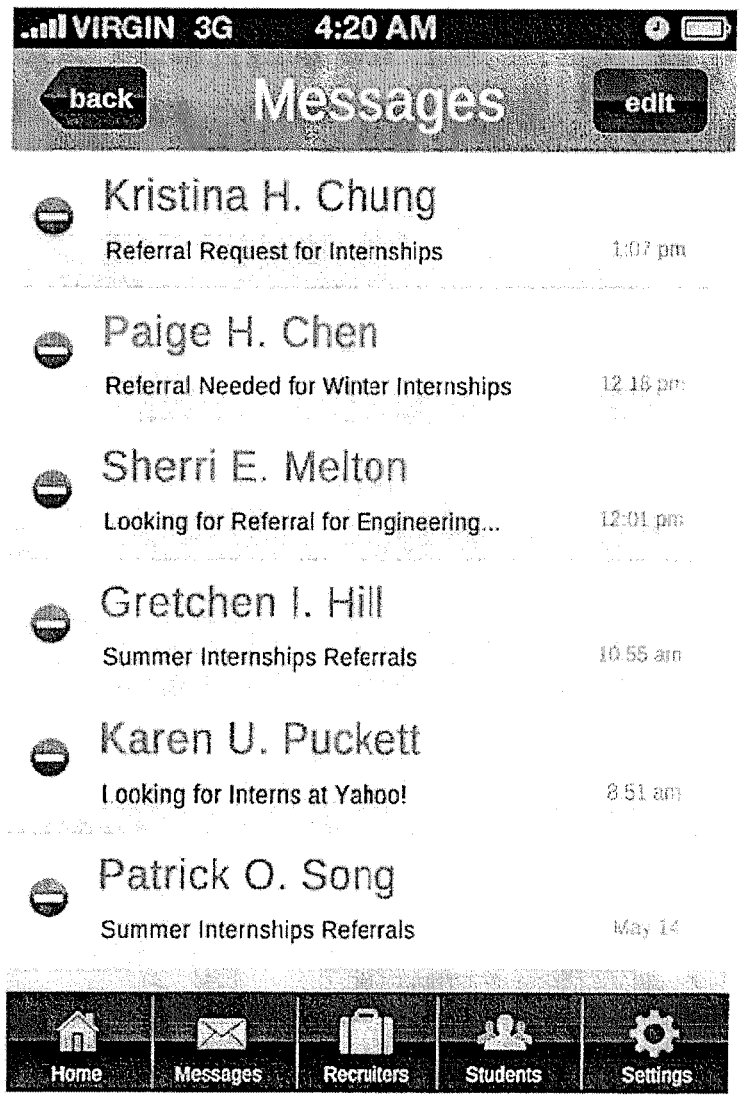

FIG. 53 demonstrates how messages can be deleted from the professor's message inbox. When a professor is on their main message screen and presses the edit button in the top right hand corner minus signs appear next to the messages. When the user clicks the minus sign the message will be deleted. When the user presses the back or done buttons the user is redirected back to the inbox.

Figure 54:
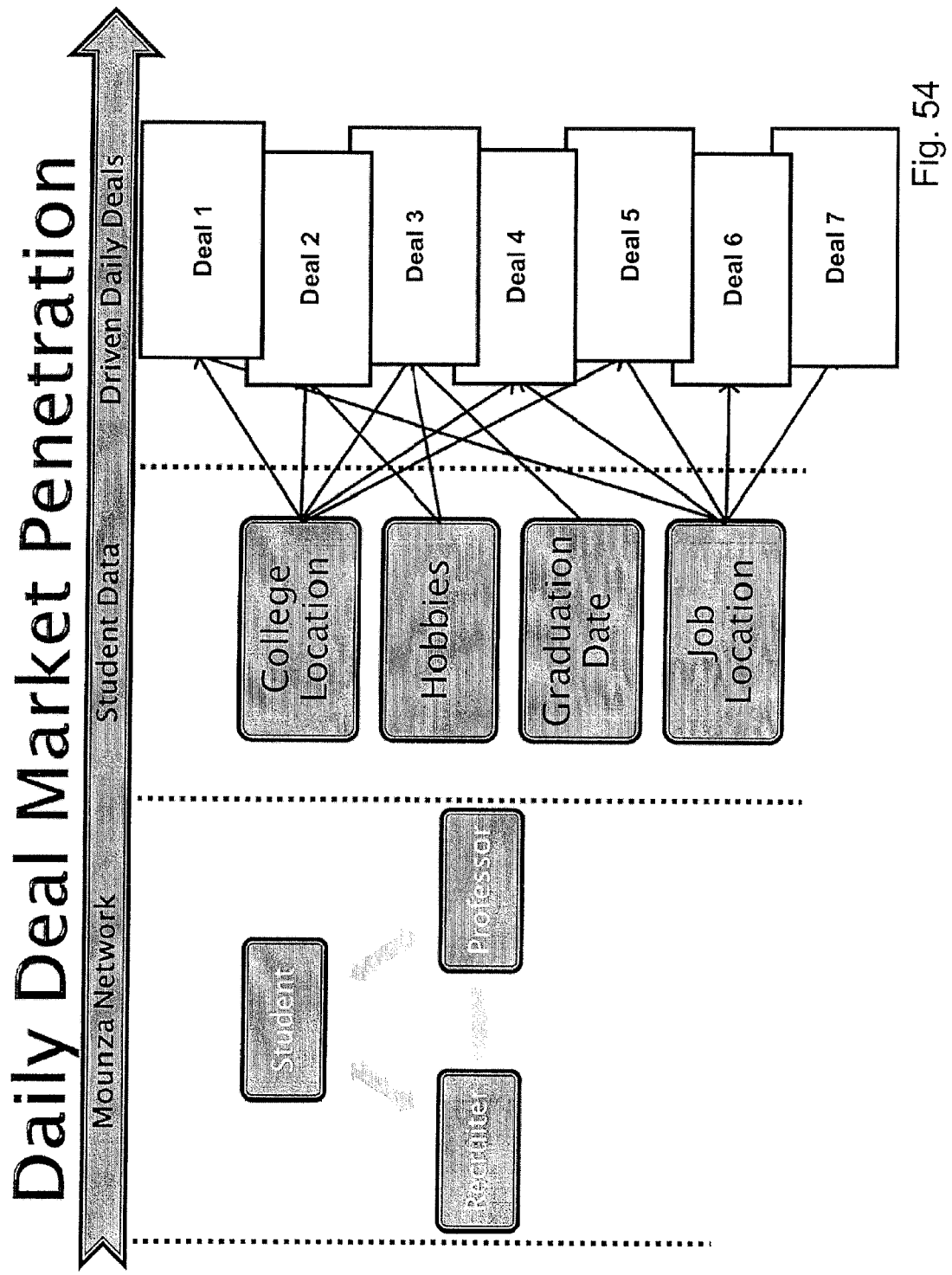
FIG. 54 is a diagram illustrating business methods according to an embodiment.

Embodiments of the invention include a business method for using network data. Embodiments of the Mounza network as described herein enable highly focused data to be collected and organized. As illustrated by FIG. 54, the data includes details about each student, for example, the data can include college location, graduation date, degree(s) obtained, hobbies, eventual job type and location, etc. This data can be sold to entities wishing goods or services to students. Detailed, custom reports are generated according to an embodiment at the request of entities. The entities are then given access to the network to provide targeted advertising to students (and also to recruiters and professors). The embodiment also includes providing employers a platform to communicate with students based on particular interests.

Various embodiments have been described by way of example, but examples not explicitly described are also within the scope of the invention. For example, in embodiments, the recruiter application is configurable by the recruiter in many ways. Recruiters can categorize and search among data in any desired way. For example, for each new job opportunity at the recruiter's company, the recruiter is asked which schools will show the job as open. When searching for candidates at a later time, the pool of candidates will be broken down into the schools and the jobs applied for. Recruiters can choose to see all candidates that did well across all of the schools, for example, or perhaps just see all of the "yes" and "maybe" candidates.

Aspects of the systems and methods described herein may be implemented as functionality programmed into any of a variety of circuitry, including programmable logic devices (PLDs), such as field programmable gate arrays (FPGAs), programmable array logic (PAL) devices, electrically programmable logic and memory devices and standard cell-based devices, as well as application specific integrated circuits (ASICs). Some other possibilities for implementing aspects of the system include: microcontrollers with memory (such as electronically erasable programmable read only memory (EEPROM)), embedded microprocessors, firmware, software, etc. Furthermore, aspects of the system may be embodied in microprocessors having software-based circuit emulation, discrete logic (sequential and combinatorial), custom devices, fuzzy (neural) logic, quantum devices, and hybrids of any of the above device types. Of course the underlying device technologies may be provided in a variety of component types, e.g., metal-oxide semiconductor field-effect transistor (MOSFET) technologies like complementary metal-oxide semiconductor (CMOS), bipolar technologies like emitter-coupled logic (ECL), polymer technologies (e.g., silicon-conjugated polymer and metal-conjugated polymer-metal structures), mixed analog and digital, etc.

It should be noted that the various functions or processes disclosed herein may be described as data and/or instructions embodied in various computer-readable media, in terms of their behavioral, register transfer, logic component, transistor, layout geometries, and/or other characteristics. Computer-readable media in which such formatted data and/or instructions may be embodied include, but are not limited to, non-volatile storage media in various forms (e.g., optical, magnetic or semiconductor storage media) and carrier waves that may be used to transfer such formatted data and/or instructions through wireless, optical, or wired signaling media or any combination thereof. Examples of transfers of such formatted data and/or instructions by carrier waves include, but are not limited to, transfers (uploads, downloads, e-mail, etc.) over the internet and/or other computer networks via one or more data transfer protocols (e.g., HTTP, FTP, SMTP, etc.). When received within a computer system via one or more computer-readable media, such data and/or instruction-based expressions of components and/or processes under the system described may be processed by a processing entity (e.g., one or more processors) within the computer system in conjunction with execution of one or more other computer programs.

Unless the context clearly requires otherwise, throughout the description and the claims, the words "comprise," "comprising," and the like are to be construed in an inclusive sense as opposed to an exclusive or exhaustive sense; that is to say, in a sense of "including, but not limited to." Words using the singular or plural number also include the plural or singular number respectively. Additionally, the words "herein," "hereunder," "above," "below," and words of similar import refer to this application as a whole and not to any particular portions of this application. When the word "or" is used in reference to a list of two or more items, that word covers all of the following interpretations of the word: any of the items in the list, all of the items in the list and any combination of the items in the list.

The above description of illustrated embodiments of the systems and methods is not intended to be exhaustive or to limit the systems and methods to the precise forms disclosed. While specific embodiments of, and examples for, the systems components and methods are described herein for illustrative purposes, various equivalent modifications are possible within the scope of the systems, components and methods, as those skilled in the relevant art will recognize. The teachings of the systems and methods provided herein can be applied to other processing systems and methods, not only for the systems and methods described above.

The elements and acts of the various embodiments described above can be combined to provide further embodiments. These and other changes can be made to the systems and methods in light of the above detailed description.

In general, in the following claims, the terms used should not be construed to limit the systems and methods to the specific embodiments disclosed in the specification and the claims, but should be construed to include all processing systems that operate under the claims. Accordingly, the systems and methods are not limited by the disclosure, but instead the scope of the systems and methods is to be determined entirely by the claims.

While certain aspects of the systems and methods are presented below in certain claim forms, the inventors contemplate the various aspects of the systems and methods in any number of claim forms. For example, while only one aspect of the systems and methods may be recited as embodied in machine-readable medium, other aspects may likewise be embodied in machine-readable medium. Accordingly, the inventors reserve the right to add additional claims after filing the application to pursue such additional claim forms for other aspects of the systems and methods.

What is claimed is:

1. A computer based method for wireless data sharing, the method comprising:
   a document review and transfer system receiving a request for an identifier (ID) from a first user;
   the system generating a unique ID for the first user;
   the document review and transfer system receiving a request for an identifier from a second user;
   the system generating a unique ID for the second user;
   the first user uploading a document to the system;
   the system storing the document on a cloud server;
   the system providing access to users, wherein access comprises collaborative review of the document simultaneously by multiple users, revision of the document by one or more users; recording comments on the document by one or more users, and transfer of the document to various user devices; and
   the system keeping document versions consistent across the cloud server and all user devices.

2. The method of claim 1, further comprising:
   receiving the second user's ID from the first user;
   in response to receiving the second user's ID, sending contact information of the second user to the first user; and
   transferring a first user document to the second user, comprising storing the first user document on the cloud server such that the first user document is associated with selected data related to the first user.

3. The method of claim 2, wherein the selected data comprises a school attended by the first user, and one or more jobs applied for by the first user.

4. The method of claim 2, further comprising receiving an input from the first user allowing or disallowing transfer of the first user document.

5. The method of claim 2, further comprising:
   displaying the first user document on one of multiple second user devices; and
   displaying a status of the first user to the second user when the second user views the first user document, wherein the status comprises available, idle, and not available.

6. The method of claim 2, further comprising:
   displaying the first user document to the second user on one of multiple second user devices;
   receiving document review input from the second user, the input comprising,
      highlighting of document text;
      direct marking on the document through contact with a surface of the device; and
      entry of text comments using a keyboard of the device.

7. The method of claim 2, further comprising:
   receiving input from the second user to configure classifications for documents;
   receiving input from the second user to classify the document; and
   storing the classification so as to be associated with the document.

8. The method of claim 2, further comprising;
   presenting a user interface to the second user that includes an option to collaboratively view the first user document with other users; and
   hosting collaborative review sessions that include chat and text.

9. The method of claim 1, further comprising;
   using a location-based service to show user the locations of other users; and
   receiving a request from a user to transfer data with another user based on the other user's location.

10. The method of claim 1, further comprising:
    receiving a request from a user to send a document to another user for review;
    sending the document in response to the request; and
    receiving and storing any marking or text comments entered by the recipient user.

11. The method of claim 1, further comprising receiving instructions through an application programming interface (API) to automatically upload documents to the system.

12. The method of claim 6, further comprising receiving an input from the second user to transfer the document to another entity for storage, comprising automatically transferring documents to the other entity as programmed through a system API.

13. The method of claim 1, wherein generating unique IDs comprises using the user's location.

14. The method of claim 1, wherein the unique IDs are time-limited.

15. The method of claim 2, further comprising receiving an input from the second user indicating that no contact information should be sent to another user.

16. The method of claim 1, wherein the document is viewable in the format in which it was uploaded to the system, and wherein the format comprises .jpg, .gif, .png, and .tiff.

17. The method of claim 2, further comprising presenting a user interface to the second including a button to allow the second user to contact the first user via at least one of SMS, text, and phone.

18. A document review and transfer system comprising:
    a plurality of cloud based storage devices coupled to the Internet;
    a plurality of user devices configurable to execute instructions that include communication with the system;
    a plurality of processor coupled to the storage devices and configurable to execute instructions for a document review and transfer method, the method comprising,
       receiving a request for an identifier (ID) from a first user;
       generating a unique ID for the first user;
       receiving a request for an identifier from a second user;
       generating a unique ID for the second user;
       uploading a document to the system;
       storing the document on the storage devices;
       providing access to users, wherein access comprises collaborative review of the document simultaneously by multiple users, revision of the document by one or more users; recording comments on the document by one or more users, and transfer of the document to various user devices; and
       keeping document versions consistent across the storage devices and all user devices.

19. The system of claim 18, wherein the method further comprises:
    receiving the second user's ID from the first user;
    in response to receiving the second user's ID, sending contact information of the second user to the first user; and
    transferring a first user document to the second user, comprising storing the first user document on the cloud server such that the first user document is associated with selected data related to the first user.

20. The system of claim 19, wherein the selected data comprises a school attended by the first user, and one or more jobs applied for by the first user.

21. The method of claim 19, further comprising receiving an input from the first user allowing or disallowing transfer of the first user document.

22. The method of claim 19, further comprising:
displaying the first user document on one of multiple second user devices; and
displaying a status of the first user to the second user when the second user views the first user document, wherein the status comprises available, idle, and not available.

23. The method of claim 19 further comprising:
displaying the first user document to the second user on one of multiple second user devices;
receiving document review input from the second user, the input comprising,
highlighting of document text;
direct marking on the document through contact with a surface of the device; and
entry of text comments using a keyboard of the device.

24. The method of claim 19, further comprising:
receiving input from the second user to configure classifications for documents;
receiving input from the second user to classify the document; and
storing the classification so as to be associated with the document.

25. The method of claim 19, further comprising;
presenting a user interface to the second user that includes an option to collaboratively view the first user document with other users; and
hosting collaborative review sessions that include chat and text.

26. The method of claim 18, further comprising;
using a location-based service to show user the locations of other users; and
receiving a request from a user to transfer data with another user based on the other user's location.

27. The method of claim 18, further comprising:
receiving a request from a user to send a document to another user for review;
sending the document in response to the request; and
receiving and storing any marking or text comments entered by the recipient user.

28. The method of claim 18, further comprising receiving instructions through an application programming interface (API) to automatically upload documents to the system.

29. The method of claim 23, further comprising receiving an input from the second user to transfer the document to another entity for storage, comprising automatically transferring documents to the other entity as programmed through a system API.

30. A computer readable medium having instruction stored thereon, that when executed in a processor perform a document review and transfer method, the method comprising:
storing a plurality of documents in a cloud based storage system;
allowing users of the system to upload documents;
generating unique IDs for system users;
allowing access to stored documents to various users based on user permission to one another, wherein access comprises,
the transfer of a document from one user to another via the system;
viewing the document in its original format on a plurality of user devices;
receiving and storing revisions and comments on the document, comprising entry of text comments using a key board of the user device, and marks made directly on the document by contacting a surface of the user device; and
hosting collaborative review session among user to review, revise, and comment upon the document;
keeping versions of the document consistent across the storage system and all user devices; and
communicating with third party entities to transfer documents to the entities as directed by users, wherein communicating comprises providing at least one application programming interface (API) to the entity.

* * * * *